US012585352B2

(12) United States Patent
Kim

(10) Patent No.: US 12,585,352 B2
(45) Date of Patent: Mar. 24, 2026

(54) IN-CELL TOUCH DISPLAY DEVICE

(71) Applicant: LG Display Co., Ltd., Seoul (KR)

(72) Inventor: Cheolse Kim, Gapyeong-gun (KR)

(73) Assignee: LG Display Co., Ltd., Seoul (KR)

( * ) Notice: Subject to any disclaimer, the term of this patent is extended or adjusted under 35 U.S.C. 154(b) by 7 days.

(21) Appl. No.: 18/941,627

(22) Filed: Nov. 8, 2024

(65) Prior Publication Data

US 2025/0251807 A1 Aug. 7, 2025

(30) Foreign Application Priority Data

Feb. 6, 2024 (KR) ........................ 10-2024-0018257

(51) Int. Cl.
*G06F 3/041* (2006.01)
(52) U.S. Cl.
CPC ........ *G06F 3/0412* (2013.01); *G06F 3/04166* (2019.05)
(58) Field of Classification Search
CPC ........................... G06F 3/0412; G06F 3/04166
See application file for complete search history.

(56) References Cited

U.S. PATENT DOCUMENTS

| | | | |
|---|---|---|---|
| 2017/0046004 A1* | 2/2017 | Choi ..................... | G06F 3/0446 |
| 2017/0090643 A1* | 3/2017 | Kim ........................ | G06F 3/044 |
| 2018/0004347 A1* | 1/2018 | Guedon ................. | G06F 3/044 |

FOREIGN PATENT DOCUMENTS

KR 10-2559085 B1 7/2023

* cited by examiner

*Primary Examiner* — Peter D Mcloone
(74) *Attorney, Agent, or Firm* — Fenwick & West LLP

(57) ABSTRACT

An in-cell touch display device is presented herein that features an increased accuracy of touch sensitivity and touch recognition. The in-cell touch display device includes a display panel including a transistor formation layer with a driving transistor, a light emitting element layer on the transistor formation layer that includes a light emitting element, and a plurality of touch electrodes in the transistor formation layer or the light emitting element that are driven during a display period and a touch period in a time-division manner, a touch driving circuit for supplying a touch driving voltage to a touch electrode, and a power modulation circuit including a first RLC circuit and a second RLC circuit each including a resistor, an inductor, and a capacitor connected to a corresponding one of a high potential power line that supplies the driving transistor and a low potential power line that supplies a cathode electrode.

20 Claims, 14 Drawing Sheets

IN-CELL TOUCH DISPLAY DEVICE

CROSS-REFERENCE TO RELATED APPLICATION

This application claims the priority of Republic of Korea Patent Application No. 10-2024-0018257, filed on Feb. 6, 2024, which is hereby incorporated by reference in its entirety.

BACKGROUND

Field

The present disclosure relates to an in-cell touch display device.

Description of Related Art

As the information society develops, various types of display devices for displaying images are being developed. In addition, the development of a touch technology for applying a touch-based input method of allowing users to easily, intuitively, and conveniently input information or a command to the display device.

As described above, to apply the touch-based input method to the display device, a touch panel including a touch sensor should be separately manufactured and coupled to a display panel. The method has a disadvantage of increasing the size or thickness of the device and complicating a manufacturing process. Therefore, an in-cell touch sensor technology in which the touch sensor is embedded in the display panel is being developed without separately manufacturing the touch panel.

SUMMARY

A technology having a considerable technical difficulty is to design and manufacture a display panel in which a touch sensor is embedded. In addition, when the touch sensor including a plurality of touch electrodes is embedded in the display panel, since the touch sensor may be located very close to a display driving electrode or a display driving line inside the display panel, the possibility that a parasitic capacitance between the touch sensor and the display driving electrode or a parasitic capacitance between the touch sensor and the display driving line increases can be increased significantly, and an increase in the parasitic capacitance may lead to the degradation of touch sensitivity.

In particular, when the touch sensor is embedded in an organic light emitting diode display panel for emitting light by itself, the parasitic capacitance may be further increased due to the structural characteristics of the organic light emitting diode display panel.

Therefore, the present disclosure is directed to providing an in-cell touch display device capable of improving touch sensitivity and the accuracy of touch recognition even when an in-cell touch sensor technology is applied to the organic light emitting diode display panel.

The objects of embodiments of the present disclosure are not limited to the above-described objects, and other objects that are not mentioned will be able to be clearly understood by those skilled in the art from the following description.

An in-cell touch display device according to one or more embodiments of the present disclosure may include a display panel including a transistor formation layer that includes a driving transistor having a semiconductor, a source electrode, a drain electrode, and a gate electrode of a driving transistor, a light emitting element layer on the transistor formation layer that includes a light emitting element having an anode electrode, an emission layer, and a cathode electrode of the light emitting element, and a plurality of touch electrodes in the transistor formation layer or the light emitting element, wherein the plurality of touch electrodes are driven during a display period and a touch period in a time-division manner, a touch driving circuit configured to supply a touch driving voltage of a predetermined cycle and a predetermined amplitude to a touch electrode of the plurality of touch electrodes, and a power modulation circuit including a first RLC circuit and a second RLC circuit, the first RLC circuit comprising a first resistor, a first inductor, and a first capacitor that are connected to a high potential power line through which a high potential power voltage is supplied to the driving transistor, at least the first resistor and the first inductor connected in parallel, the second RLC circuit comprising a second resistor, a second inductor, and a second capacitor that are connected to a low potential power line through which a low potential power voltage that is less than the high potential power voltage is supplied to the cathode electrode, at least the second resistor and the second inductor connected in parallel.

An in-cell touch display device according to one or more other embodiments of the present disclosure may include a display panel including a transistor formation layer that includes a driving transistor having a semiconductor, a source electrode, a drain electrode, and a gate electrode, a light emitting element layer on the transistor formation layer that includes light emitting element having an anode electrode, an emission layer, and a cathode electrode, and a plurality of touch electrodes in the transistor formation layer or the light emitting element, wherein the plurality of touch electrodes are driven during a display period and a touch period in a time-division manner, a touch driving circuit configured to supply a touch driving voltage of a predetermined cycle and a predetermined amplitude to a touch electrode of the plurality of touch electrodes, a first RLC circuit including a first resistor, a first inductor, and a first capacitor that are connected to a high potential power line through which a high potential power voltage is supplied to the driving transistor, at least the first resistor and the first inductor connected in parallel, the first RLC circuit modulating the high potential power voltage into a high potential modulation voltage having a first resonance frequency of the first resistor, the first inductor, and the first capacitor, and the first RLC circuit supplying the high potential modulation voltage to the display panel, a second RLC circuit including a second resistor, a second inductor, and a second capacitor that are connected to a low potential power line through which a low potential power voltage that is less than the high potential power voltage is supplied to the cathode electrode, at least the second resistor and the second inductor connected in parallel, the second RLC circuit modulating the low potential power voltage into a low potential modulation voltage having a second resonance frequency of the second resistor, the second inductor, and the second capacitor, and the second RLC circuit supplying the low potential modulation voltage to the display panel, and an addition circuit configured to output a modulated display voltage to a display driving circuit by adding the low potential modulation voltage and a display voltage, and output a modulated touch voltage to the touch driving circuit by adding the low potential modulation voltage and the touch driving voltage.

An in-cell touch display device according to still one or more other embodiments of the present disclosure may include a display panel including a plurality of sub-pixels and a plurality of touch electrodes, the display panel driven during a display period and a touch period in a time-division manner, a source driver circuit configured to supply, during the display period, a data voltage corresponding to image data to the display panel, a gate driver circuit configured to supply, during the display period, a scan pulse to the display panel, the scan pulse synchronized with the data voltage, a touch driving circuit configured to supply a touch driving voltage of a predetermined cycle and a predetermined ampli-tude to a touch electrode of the plurality of touch electrodes and sense a change in capacitance of the touch electrode, and a power modulation circuit configured to modulate a high potential power voltage into a high potential modulation voltage having a same cycle and an amplitude as the touch driving voltage, modulate a low potential power voltage that is less than the a high potential power voltage into a low potential modulation voltage having the same cycle and the same amplitude as the touch driving voltage, supply, during the touch period, the high potential modulation voltage and the low potential modulation voltage to the plurality of sub-pixels, supply a modulated display voltage having the same cycle and the same amplitude as the touch driving voltage to the gate driver circuit and the source driver circuit, and supply a modulated touch voltage having the same cycle and the amplitude as the touch driving voltage based on the high potential modulation voltage and the low potential modulation voltage.

An in-cell touch display device according to still one or more other embodiments of the present disclosure may include a display panel including a transistor formation layer comprising a driving transistor, a light emitting element layer including a light emitting device that is connected to the driving transistor and emits light during a display period of the in-cell touch display device, and a touch electrode in the transistor formation layer or the light emitting element layer, a touch driving circuit configured to supply a touch driving voltage to the touch electrode and senses a change in capacitance of the touch electrode during a touch period of the touch display device, the touch period non-overlapping with the display period, and a power modulation circuit including a first RLC circuit having a first resonance fre-quency and a second RLC circuit having a second resonance frequency that is different from the first resonance fre-quency, wherein the first RLC circuit modulates a high potential power voltage into a high potential modulation voltage of the first resonance frequency and outputs the high potential modulation voltage to the driving transistor during the touch period, and the second RLC circuit modulates a low potential power voltage that is less than the high potential power voltage into a low potential modulation voltage of the second resonance frequency during the touch period and outputs the low potential power voltage to the light emitting device.

DETAILED DESCRIPTION

Figure 1:
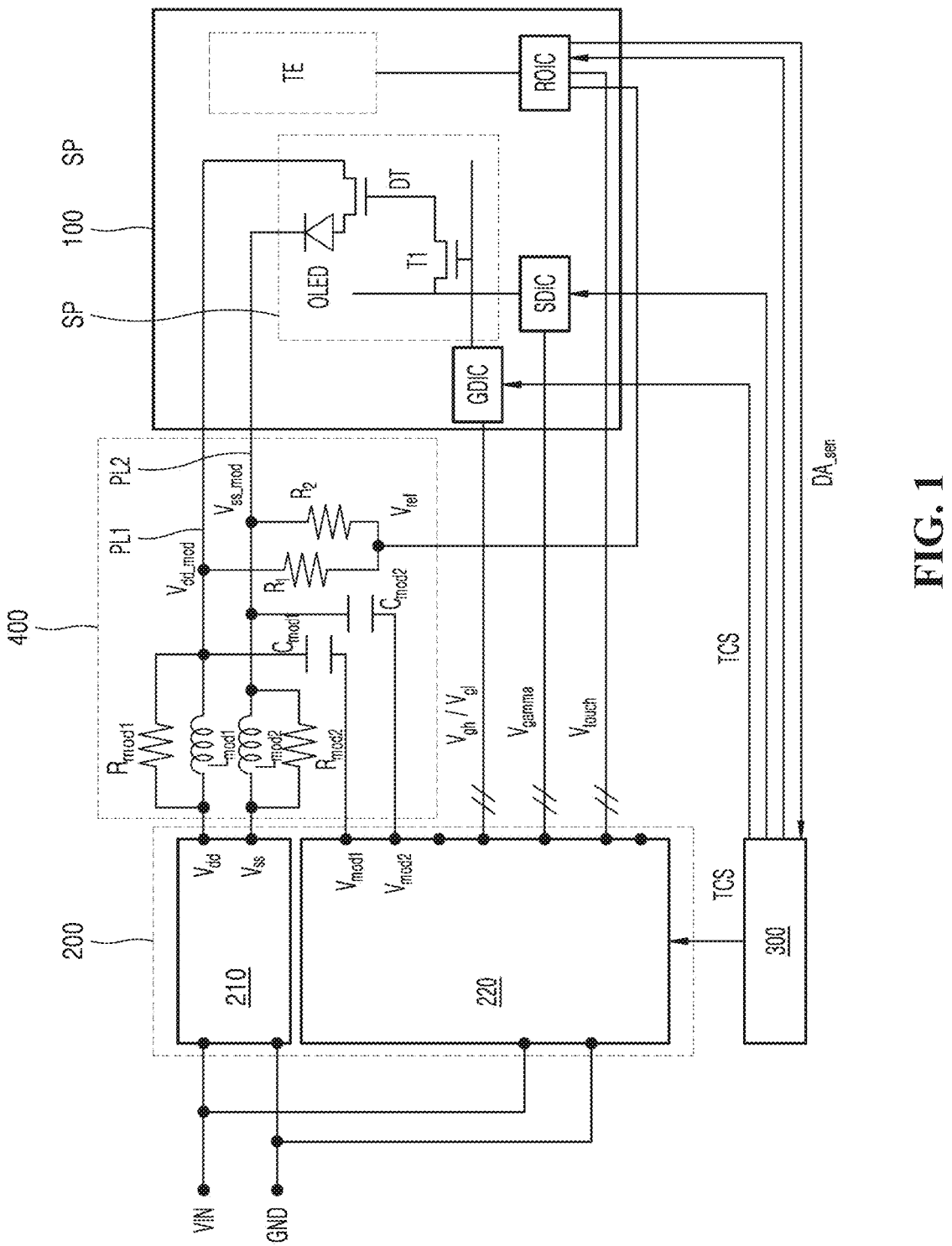
FIG. 1 shows an in-cell touch display device according to one or more embodiments of the present disclosure.

Advantages and features of the present disclosure and methods for achieving them will become clear with refer-ence to embodiments described below in detail in conjunc-tion with the accompanying drawings. However, the present disclosure is not limited to the embodiments disclosed below but can be implemented in various different forms, these embodiments are merely provided to make the embodiments of the present disclosure complete and fully inform those skilled in the art to which the present disclosure pertains of the scope of the present disclosure, and the present disclo-sure is defined by the scope of the appended claims.

Since shapes, sizes, ratios, angles, numbers, and the like disclosed in the drawings for describing the embodiments of the present disclosure are illustrative, the present disclosure is not limited to the illustrated items. The same reference number indicates the same components throughout the dis-closure. In addition, in describing the present disclosure, when it is determined that the detailed description of a related known technology may unnecessarily obscure the gist of the present disclosure, detailed description thereof will be omitted. When terms "comprises," "has," "includes," and the like described in the present disclosure are used, other parts may be added unless "only" is used. When a component is expressed in the singular, it includes a case in which the component is provided as a plurality of compo-nents unless specifically stated otherwise.

In construing a component, the component is construed as including the margin of error even when there is no separate explicit description.

When the temporal relationship is described, for example, when the temporal relationship is described using the term "after," "subsequently," "then," "before," or the like, it may include a non-consecutive case unless the term "immediately" or "directly" is used.

In the description of the signal flow relationship, for example, in the case of "a signal is transmitted from node A to node B," a case where the signal is transmitted from node A to node B via another node may be included unless "immediately" or "directly" is used.

Although terms such as first, second, and the like are used to describe various components, these components are not limited by these terms. The terms are only used to distinguish one component from another. Therefore, a first component described below may be a second component within the technical spirit of the present disclosure.

Features of various embodiments of the present disclosure can be coupled or combined partially or entirely, and various technological interworking and driving are possible, and the embodiments may be implemented independently of each other or implemented together in an associated relationship.

Hereinafter, an in-cell touch display device capable of improving touch sensitivity and the accuracy of touch recognition according to some embodiments will be described.

Figure 2:
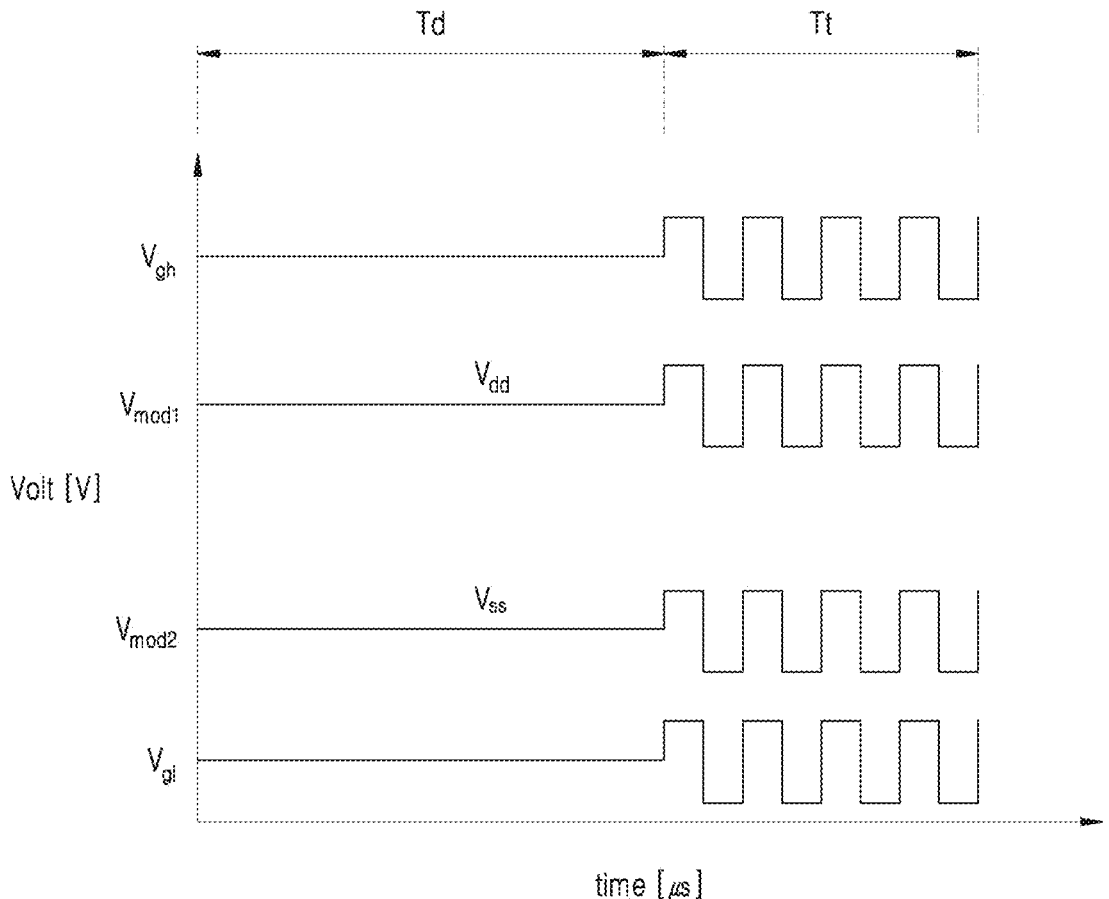
FIG. 2 shows a timing diagram of the in-cell touch display device according to one or more embodiments of the present disclosure.

FIG. 1 shows an in-cell touch display device according to one or more embodiments of the present disclosure. FIG. 2 shows a timing diagram of the in-cell touch display device according to one or more embodiments of the present disclosure.

Referring to FIGS. 1 and 2, the in-cell touch display device may include a display panel 100, a power supply circuit 200, a power modulation circuit 400, a source driver SDIC (e.g., source driver circuit), a gate driver GDIC (e.g., gate driver circuit), a touch driving circuit ROIC, a controller 300, etc.

The display panel 100 may include a plurality of sub-pixels SP and a plurality of touch electrodes TE and may be driven in a display period Td and a touch period Tt in a time-division manner. The plurality of touch electrodes TE may be embedded in a pixel array to detect a touch input.

During the display period Td, a data voltage corresponding to an image signal may be written on the pixel array of the display panel 100, and during the driving time of the touch sensor Tt, the touch electrodes TE of the display panel 100 may be driven to detect the touch input.

The power supply circuit 200 may include a first power supply circuit 210 and a second power supply circuit 220.

The first power supply circuit 210 may generate a high potential power voltage $V_{dd}$ and a low potential power voltage $V_{ss}$ based on input power VIN and ground power GND and supply the high potential power voltage $V_{dd}$ and the low potential power voltage $V_{ss}$ to first RLC circuits $R_{mod1}$, $L_{mod1}$, and $C_{mod1}$ and second RLC circuits $R_{mod2}$, $L_{mod2}$, and $C_{mod2}$ of the power modulation circuit 400, respectively.

The second power supply circuit 220 may generate a first modulation control voltage $V_{mod1}$ and a second modulation control voltage $V_{mod2}$ used to modulate the high potential power voltage $V_{dd}$ and the low potential power voltage $V_{ss}$ based on the input power VIN and ground power GND and supply the first modulation control voltage $V_{mod1}$ and the second modulation control voltage $V_{mod2}$ to one ends of the first capacitor $C_{mod1}$ of the first RLC circuit and one end of the second capacitor $C_{mod2}$ of the second RLC circuit, respectively.

During the display period, the second power supply circuit 220 may supply the first modulation control voltage $V_{mod1}$ at the level of the high potential power voltage $V_{dd}$ and supply the second modulation control voltage $V_{mod2}$ at the level of the low potential power voltage $V_{ss}$.

In addition, during the touch period, the second power supply circuit 220 may supply the first modulation control voltage $V_{mod1}$ at a level having a predetermined cycle and amplitude with respect to the level of the high potential power voltage $V_{dd}$ and supply the second modulation control voltage $V_{mod2}$ at a level having a predetermined cycle and amplitude with respect to the level of the low potential power voltage $V_{ss}$.

In addition, during the display period, the second power supply circuit 220 may generate a high potential gate driving voltage $V_{gh}$ and a low potential gate driving voltage $V_{gl}$ based on the input power VIN and the ground power GND and supply the high potential gate driving voltage $V_{gh}$ and the low potential gate driving voltage $V_{gl}$ to the gate driver GDIC.

In addition, during the display period, the second power supply circuit 220 may supply a gamma voltage $V_{gamma}$ to the source driver SDIC based on the input power VIN and the ground power GND.

In addition, during the touch period, the second power supply circuit 220 may modulate the high potential gate driving voltage $V_{gh}$ into the level having the predetermined cycle and amplitude with respect to the high potential gate driving voltage $V_{gh}$ and modulate the low potential gate driving voltage $V_{gl}$ into the level having the predetermined cycle and amplitude with respect to the low potential gate driving voltage $V_{gl}$, and supply the modulated high potential and low potential gate driving voltages to the gate driver GDIC.

In addition, during the touch period, the second power supply circuit 220 may supply a touch driving voltage $V_{touch}$ having a predetermined cycle and amplitude to the touch driving circuit ROIC for sensing a change in capacitance of the touch electrode TE.

In addition, the second power supply circuit 220 may modulate the gamma voltage $V_{gamma}$ into a level having a predetermined cycle and amplitude with respect to the gamma voltage $V_{gamma}$ and supply the modulated gamma voltage to the source driver SDIC.

The power modulation circuit 400 may include the first RLC circuits $R_{mod1}$, $L_{mod1}$, and $C_{mod1}$ in which a resistor, an inductor, and a capacitor are connected in parallel to a high potential power line PL1 through which the high potential power voltage $V_{dd}$ is supplied to the display panel 100, and the second RLC circuits $R_{mod2}$, $L_{mod2}$, and $C_{mod2}$ in which a resistor, an inductor, and a capacitor are connected in parallel to a low potential power line PL2 through which the low potential power voltage $V_{ss}$ is supplied to the display panel 100.

During the touch period, the power modulation circuit 400 may modulate the high potential power voltage $V_{dd}$ and the low potential power voltage $V_{ss}$ into a high potential modulation voltage $V_{dd\_mod}$ and a low potential modulation voltage $V_{ss\_mod}$ that have a resonance frequency of the resistor, the inductor, and the capacitor and supply the high potential modulation voltage $V_{dd\_mod}$ and the low potential modulation voltage $V_{ss\_mod}$ to a plurality of sub-pixels SP of the display panel 100.

During the touch period, the first RLC circuits $R_{mod1}$, $L_{mod1}$, and $C_{mod1}$ may receive the first modulation control voltage $V_{mod1}$ having a predetermined cycle and amplitude through one end of the first capacitor $C_{mod1}$. During the touch period, the second RLC circuits $R_{mod2}$, $L_{mod2}$, and $C_{mod2}$ may receive the second modulation control voltage $V_{mod2}$ having a predetermined cycle and amplitude through one end of the second capacitor $C_{mod2}$.

Here, during the display period, the first modulation control voltage $V_{mod1}$ may be applied at the level of the high potential power voltage $V_{dd}$, and during the display period, the second modulation control voltage $V_{mod2}$ may be applied at the level of the low potential power voltage $V_{ss}$.

In addition, during the touch period, the first modulation control voltage $V_{mod1}$ may be applied at the level having the predetermined cycle and amplitude with respect to the level of the high potential power voltage $V_{dd}$, and during the touch period, the second modulation control voltage $V_{mod2}$ may be applied at the level having the predetermined cycle and amplitude with respect to the level of the low potential power voltage $V_{ss}$.

The first RLC circuits $R_{mod1}$, $L_{mod1}$, and $C_{mod1}$ may include the first resistor $R_{mod1}$ having one end connected to an output terminal of the high potential power voltage $V_{dd}$ and the other end connected to a driving transistor DT of the sub-pixel SP, the first inductor $L_{mod1}$ having one end connected to the output terminal of the high potential power voltage $V_{dd}$ and the other end connected to the driving transistor DT of the sub-pixel SP, and the first capacitor $C_{mod1}$ having one end connected to the output terminal of the first modulation control voltage $V_{mod1}$ and the other end connected to the driving transistor DT of the sub-pixel SP.

The second RLC circuits $R_{mod2}$, $L_{mod2}$, and $C_{mod2}$ may include the second resistor $R_{mod2}$ having one end connected to an output terminal of the lower potential power voltage $V_{ss}$ and the other end connected to a light emitting element OLED of the sub-pixel SP, the second inductor $L_{mod2}$ having one end connected to the output terminal of the low potential power voltage $V_{ss}$ and the other end connected to the light emitting element OLED of the sub-pixel SP, and the second capacitor $C_{mod2}$ having one end connected to the output terminal of the second modulation control voltage $V_{mod2}$ and the other end connected to the light emitting element OLED of the sub-pixel SP.

The power modulation circuit 400 may further include a first distribution resistor R1 having one end connected to the first power line PL1 and the other end connected to an output terminal of a reference voltage $V_{ref}$, and a second distribution resistor $R_2$ having one end connected to the second power line PL2 and the other end connected to the output terminal of the reference voltage $V_{ref}$.

A node between the first distribution resistor $R_1$ and the second distribution resistor $R_2$ is the output terminal of the reference voltage $V_{ref}$, and the output terminal of the reference voltage $V_{ref}$ may be connected to an input terminal of the touch driving circuit ROIC for sensing a change in capacitance of the touch electrode TE.

Here, during the touch period, the reference voltage $V_{ref}$ may be modulated into a level having the same cycle and amplitude as the high potential modulation voltage $V_{dd\_mod}$ and the low potential modulation voltage $V_{ss\_mod}$ that are modulated by the first RLC circuits $R_{mod1}$, $L_{mod1}$, and $C_{mod1}$ and the second RLC circuits $R_{mod2}$, $L_{mod2}$, and $C_{mod2}$.

The source driver SDIC may modulate input image data into the corresponding data voltage using the gamma voltage $V_{gamma}$ and supply the data voltage to a source electrode of a scan transistor T1 of the sub-pixel SP through a data line of the display panel 100.

The gate driver GDIC may generate a scan signal using the high potential gate driving voltage $V_{gh}$ and the low potential gate driving voltage $V_{gl}$ and supply the scan signal to a gate electrode of the scan transistor T1 of the sub-pixel SP through a gate line of the display panel 100.

The touch driving circuit ROIC may generate a touch driving signal having the same cycle and amplitude as the high potential modulation voltage $V_{dd\_mod}$ and the low potential modulation voltage $V_{ss\_mod}$ using the touch driving voltage $V_{touch}$ and supply the touch driving signal to a plurality of touch electrodes TE of the display panel 100.

In addition, the touch driving circuit ROIC may detect a change in capacitance of the touch electrode TE, modulate a detection voltage into detection data DA_sen, which is a digital signal, and provide the detection data DA_sen to the controller 300.

The controller 300 may control operation timings of the second power supply circuit 220, the gate driver GDIC, the source driver SDIC, and the touch driving circuit ROIC using a touch control signal TCS.

Figure 6A:
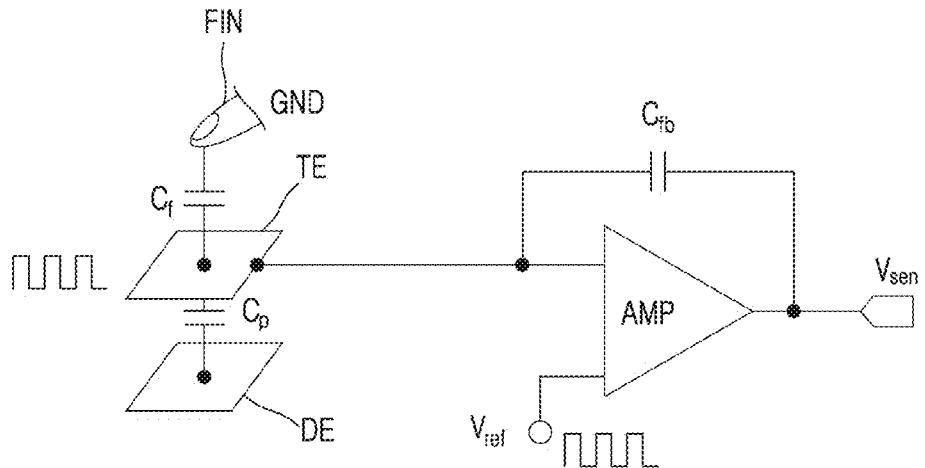
FIGS. 6A and 6B show a sensing circuit and a touch driving state of a touch driving circuit according to a first embodiment of the present disclosure.
Figure 6B:
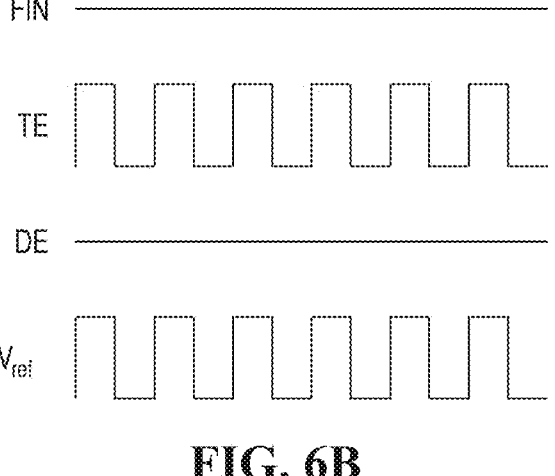

FIGS. 6A and 6B show a sensing circuit and a touch driving state of a touch driving circuit according to a first embodiment of the present disclosure.

In the case of an in-cell touch technology in which the touch electrode TE is designed directly on a backplane of the thin film transistor of the organic light emitting diode display panel, a distance between the touch electrode TE and a display electrode DE is relatively decreased, thereby greatly increasing the parasitic capacitance between the two electrodes.

In the case of add-on, the distance between the touch electrode TE and the display electrode DE is proportional to the thickness of the substrate of the touch electrode TE and has a value of about 500 um. On the other hand, in the case of in-cell touch, the distance between the touch electrode and the display electrode is greatly reduced to the level of about ~μm to increase the parasitic capacitance of a parasitic capacitor Cp, thereby degrading touch performance.

Here, the display electrode DE may be defined as an electrode or line for display driving in the display panel 100.

Figure 3:
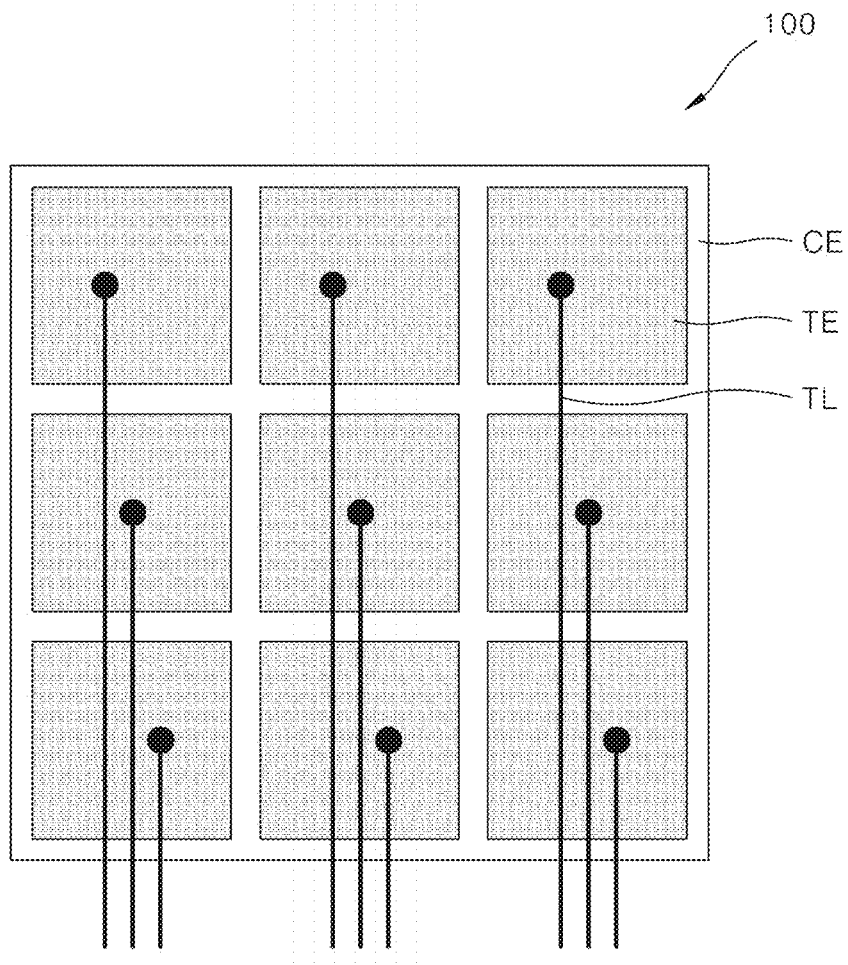
FIG. 3 schematically shows a touch sensor structure of the in-cell touch display device according to one or more embodiments of the present disclosure.

FIG. 3 schematically shows a touch sensor structure of the in-cell touch display device according to one embodiment of the present disclosure.

Referring to FIG. 3, the touch sensor of the display panel 100 may include a cathode electrode CE, the touch electrode TE, and a touch line TL.

The cathode electrode CE may be formed on an entire surface of a display area of the display panel 100.

A plurality of touch electrodes TE may be disposed in a form of a grid in a sub-pixel area corresponding to each sub-pixel in the display area.

The touch line TL may be electrically connected to each touch electrode TE. A signal of each touch electrode TE may be transmitted to an external sensing circuit through the touch line TL.

Figure 4:
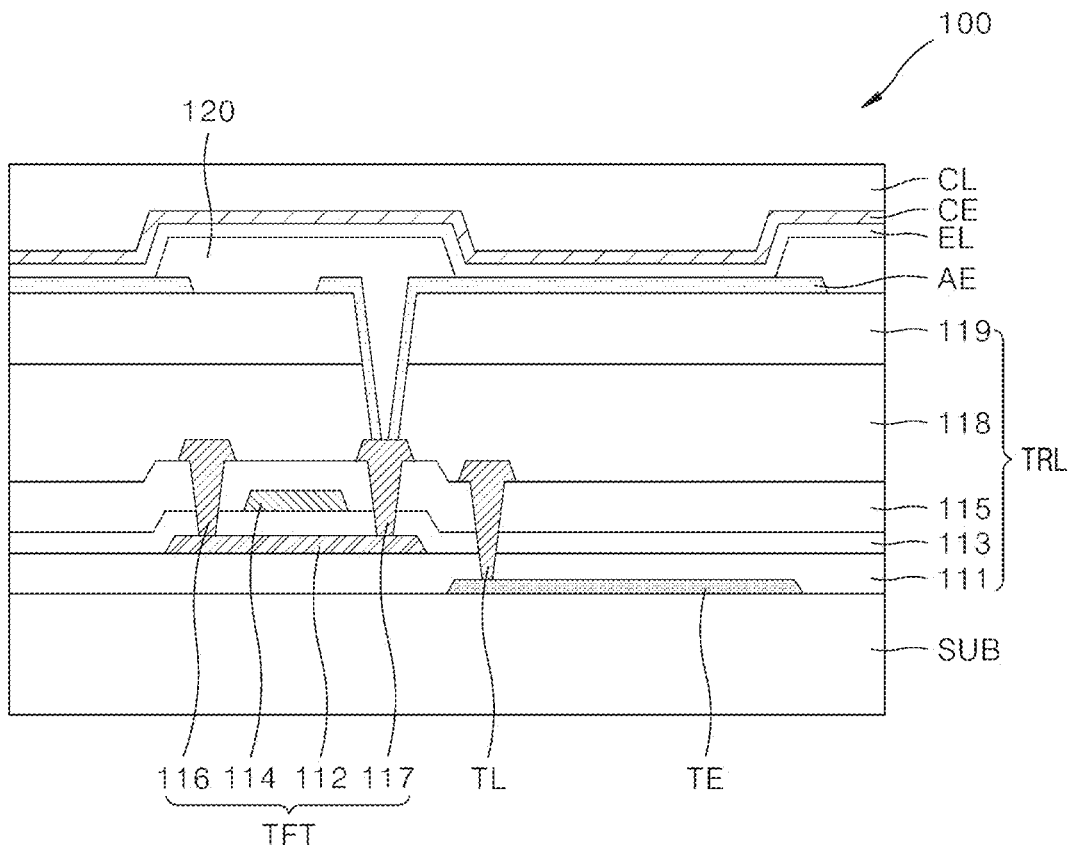
FIG. 4 shows a cross-sectional view of a display panel in the in-cell touch display device according to one or more embodiments of the present disclosure.

FIG. 4 shows a cross-sectional view of a display panel in the in-cell touch display device according to one or more embodiments of the present disclosure.

Referring to FIG. 4, the display panel 100 may include a substrate SUB, a transistor formation layer TRL on which a thin film transistor TFT and the touch electrode TE are formed, light emitting element layers AE, EL, and CE, and a cover layer CL.

The touch electrode TE may be formed on the substrate SUB at a predetermined interval.

A buffer layer 111 may be formed on the substrate SUB and the touch electrode TE. The buffer layer 111 may be made of an insulating material.

A semiconductor 112 of the thin film transistor TFT may be formed on the buffer layer 111.

A gate insulating layer 113 may be formed on the semiconductor 112 and the buffer layer 111.

A gate electrode 114 may be formed at a location overlapping the semiconductor 112 on the gate insulating layer 113.

An interlayer insulating layer 115 may be formed on the gate electrode 114 and the gate insulating layer 113.

A source electrode 116 and a drain electrode 117 may be formed on the interlayer insulating layer 115. The source electrode 116 and the drain electrode 117 may be electrically connected to the semiconductor 112 through contact holes.

In addition, the touch line TL may be formed on the interlayer insulating layer 115. The touch line TL may be electrically connected to the touch electrode TE through a contact hole.

A first planarization layer 118 may be formed on the source electrode 116, the drain electrode 117, the touch line TL, and the interlayer insulating layer 115.

A second planarization layer 119 may be formed on the first planarization layer 118.

The anode electrode AE of the organic light emitting diode may be formed on the second planarization layer 119. The anode electrode AE may be electrically connected to the drain electrode 117 of the thin film transistor TFT through a pixel contact hole.

In addition, a bank layer 120 may be formed on a portion of the second planarization layer 119 and a portion of the anode electrode AE. The bank layer 120 may be made of an opaque material to prevent light interference between pixels adjacent to each other.

An emission layer EL may be formed on the anode electrode AE. The emission layer EL may be made of an organic light emitting material.

The cathode electrode CE may be formed on the emission layer EL.

A cover layer CL may be formed on the cathode electrode CE. The cover layer CL may be made of a transparent material.

During the touch period, the touch driving signal having the predetermined cycle and amplitude may be applied to the touch electrode TE, and the low potential modulation voltage $V_{ss\_mod}$ having the same cycle and amplitude as the touch driving signal may be applied to the cathode electrode CE.

More specifically, the touch electrode TE may be formed when the thin film transistor backplane (TFT backplane) is manufactured. For example, the touch electrode TE may first be formed using the transparent electrode, and a process of the thin film transistor TFT may be performed. Here, the thin film transistor backplane may be defined as a layer including the substrate SUB and the transistor formation layer TRL.

In addition, when the source electrode 116 and the drain electrode 117 are formed, the touch line TL may be formed on the same layer as the source electrode 116 and the drain electrode 117 and connected to the touch electrode TE. The touch electrode TE may form a coupling capacitor with the cathode electrode CL. The coupling capacitor may be formed between the touch electrode TE and the cathode electrode CE to enable touch detection regardless of a touch location.

The anode electrode AE between the touch electrode TE and the cathode electrode CE may be considered a floating electrode because the resistance of the driving thin film transistor becomes very large upon expressing a low grayscale, and thus the capacitance value of the coupling capacitor can be maintained.

In addition, the influence of the anode electrode AE between the touch electrode TE and the cathode electrode CE on the coupling capacitor may be very small because a capacitor between the cathode electrode CE and the anode electrode AE, and a gate-source capacitor of the driving thin film transistor form a series capacitor due to a small resistance of the driving thin film transistor upon expressing a high grayscale. Therefore, the touch detection may be performed.

The in-cell touch display device may be driven in the display period and the touch period in a time-division manner, and the touch driving signal during the touch period may have a predetermined cycle and amplitude.

For example, during the touch period, the high potential power voltage $V_{dd}$ and the low potential power voltage $V_{ss}$ may be modulated into the high potential modulation voltage $V_{dd\_mod}$ and the low potential modulation voltage $V_{ss\_mod}$ that have the same cycle and amplitude as the touch driving voltage.

In addition, display voltages (e.g., a gamma voltage, a gate high potential voltage, and a gate low potential voltage) may be modulated into a voltage having the same cycle and amplitude as the touch driving voltage based on the high potential modulation voltage $V_{dd\_mod}$ and the low potential modulation voltage $V_{ss\_mod}$.

In addition, the reference voltage $V_{ref}$ may be modulated into a voltage having the same cycle and amplitude as the touch driving voltage based on the high potential modulation voltage $V_{dd\_mod}$ and the low potential modulation voltage $V_{ss\_mod}$.

As described above, the touch electrode TE and the thin film transistor TFT may be formed on the substrate SUB, the light emitting element layers AE, EL, and CE may be deposited on the touch electrode TE and the thin film transistor TFT, and upon touching of an object FIN, the touch signal may be transmitted to the touch line TL through an object capacitor $C_f$ and the coupling capacitor.

In this case, as the touch signal passes through the object capacitor $C_f$ and the coupling capacitor twice, an original signal is differentiated twice. In the in-cell touch display device according to the present disclosure, the sensing circuit for detecting the touch signal has two integrators embedded therein and detect the touch signal by integrating the touch signal twice. Here, the sensing circuit is a read-out circuit and may be included in the touch driving circuit ROIC (see FIG. 1).

Figure 5:
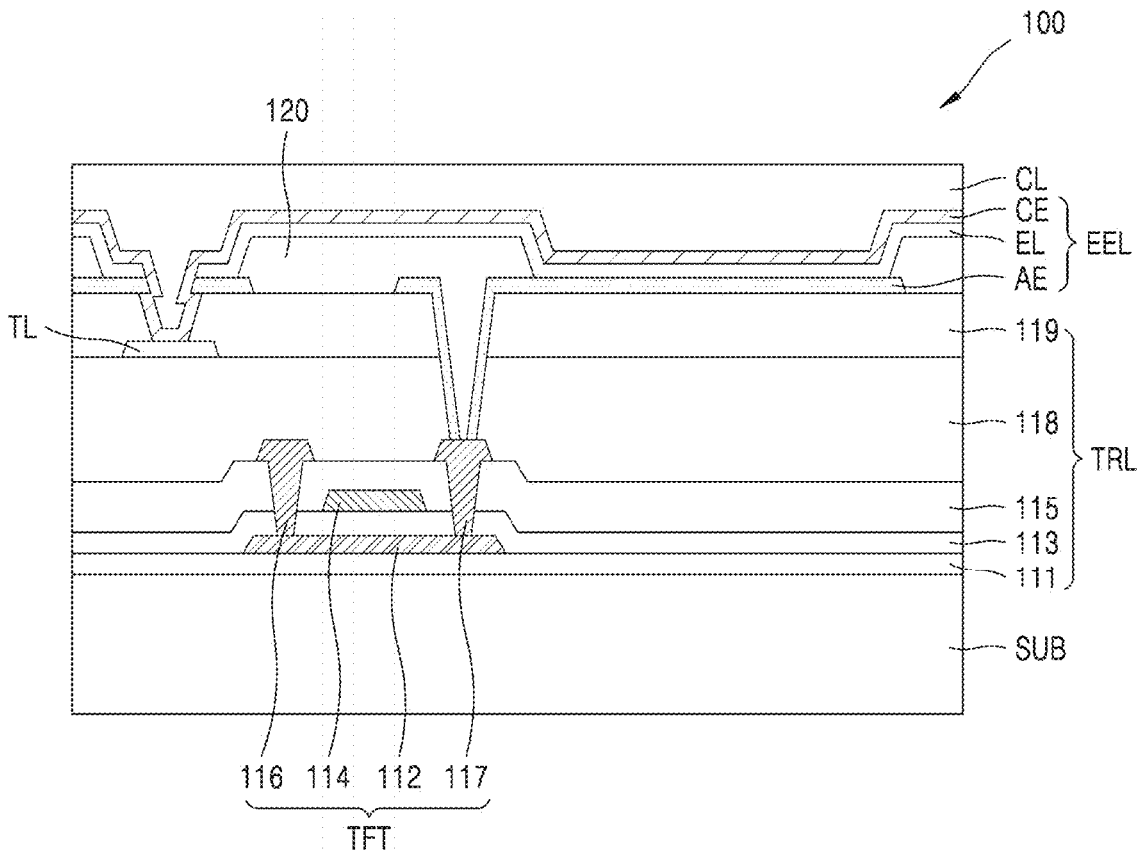
FIG. 5 shows a cross-sectional view of the display panel of the in-cell touch display device according to one or more embodiments of the present disclosure.

FIG. 5 shows a cross-sectional view of the display panel of the in-cell touch display device according to one or more embodiments of the present disclosure.

Referring to FIG. 5, the display panel 100 of the in-cell touch display device according to one or more embodiments may include the substrate SUB, the transistor formation layer TRL on which the thin film transistor TFT is formed, a light emitting element layer EEL, and the cover layer CL.

The transistor formation layer TRL may be formed on the substrate SUB. The touch line TL connected to the cathode electrode CE of the light emitting element layer EEL may be formed in the transistor formation layer TRL.

The light emitting element layer EEL may be formed on the transistor formation layer TRL. The light emitting element layer EEL may include the anode electrode AE, the emission layer EL, and the cathode electrode CE. The anode electrode AE may be formed on the transistor formation layer TRL at a predetermined interval. The emission layer EL may be formed between the anode electrode AE and the cathode electrode CE. The emission layer EL may be made of an organic material. The cathode electrode CE may be formed on the emission layer EL.

The cover layer CL may be formed on the light emitting element layer EEL. The cover layer CL may be made of a transparent material. When the touch object touches the cover layer CL, the object capacitor C may be formed between the touch object and the cathode electrode.

The transistor formation layer TRL will be described in more detail as follows.

The buffer layer 111 may be formed on the substrate SUB. The buffer layer 111 may be made of an insulating material. The semiconductor 112 of the thin film transistor TFT may be formed on the buffer layer 111.

The gate insulating layer 113 may be formed on the semiconductor 112 and the buffer layer 111. The gate electrode 114 may be formed at the location overlapping the semiconductor 112 on the gate insulating layer 113.

The interlayer insulating layer 115 may be formed on the gate electrode 114 and the gate insulating layer 113. The source electrode 116 and the drain electrode 117 may be formed on the interlayer insulating layer 115. The source electrode 116 and the drain electrode 117 may be electrically connected to the semiconductor 112 through contact holes.

The first planarization layer 118 may be formed on the source electrode 116, the drain electrode 117, and the interlayer insulating layer 115. The second planarization layer 119 may be formed on the first planarization layer 118.

The touch line TL may be formed on the second planarization layer 119. The second planarization layer 119 may include an organic insulating material.

The touch line TL may be formed at a location that does not overlap the semiconductor 112, the source electrode 116, the drain electrode 117, and the gate electrode 114 in the transistor formation layer TRL.

The light emitting element layer EEL will be described in more detail as follows.

The anode electrode AE of the light emitting element layer EEL may be formed on the second planarization layer 119. The anode electrode AE may be electrically connected to the drain electrode 117 of the thin film transistor TFT through the pixel contact hole.

The emission layer EL of the light emitting element layer EEL may be made of an organic material on the anode electrode AE.

The cathode electrode CE of the light emitting element layer EEL may be formed on the emission layer EL.

In addition, the bank layer 120 may be formed on a portion of the second planarization layer 119 and a portion of the anode electrode AE. The bank layer 120 may be made of an opaque material to prevent light interference between pixels adjacent to each other. For example, the bank layer 120 may include an opaque organic material.

In addition, the touch contact hole may be formed in the bank layer 120, the emission layer EL, and the anode electrode AE that overlap the touch line TL. The touch line TL may be electrically connected to the cathode electrode CE through the touch contact hole. FIG. 5 shows that the touch contact hole passes through the anode electrode AE and the emission layer EL, but it is illustrative, and a location of the touch contact hole is not limited thereto. For example, a touch contact hole may be formed to pass through the bank layer 120 in a portion in which at least one of the anode electrode AE and the emission layer EL is not disposed, and the cathode electrode CE and the touch line TL may be electrically connected through the touch contact hole.

The low potential modulation voltage $V_{ss\_mod}$ having the predetermined cycle and amplitude may be applied to at least one of the cathode electrode CE and the touch line TL during the touch period.

As shown in FIGS. 6A and 6B, when charges of the touch electrode TE are sensed by modulating the reference voltage $V_{ref}$, the amount of charges accumulated in a feedback capacitor Cfb of an operational amplifier AMP may become $(C_p+C_{fb})^*V_{ref}$. Here, the feedback capacitor $C_{fb}$ may be connected between input and output terminals of the operational amplifier AMP.

In this case, since the amount of charges that may be accumulated in the feedback capacitor $C_{fb}$ is limited, as the parasitic capacitance of the parasitic capacitor $C_p$ increases, the amount of charges that may be accumulated in the feedback capacitor $C_{fb}$ becomes relatively small, thereby degrading touch performance.

As described above, when the in-cell touch is designed in the organic light emitting diode display panel, the parasitic capacitance of the touch electrode TE may become very large, thereby degrading touch performance, and consumed power may increase because a very great parasitic capacitance should be filled. In addition, the driving voltage of the touch electrode may distort the display signal through the coupling capacitor with an adjacent display electrode, thereby degrading image quality. In addition, when the display and touch are driven simultaneously, the display electrode DE and the touch electrode TE are mutually influenced by the parasitic capacitance, thereby degrading image quality and touch performance at the same time.

The present disclosure provides an in-cell touch display device capable of improve touch sensitivity and the accuracy of touch recognition even when an in-cell touch sensor technology is applied to the organic light emitting diode display panel.

Figure 7A:
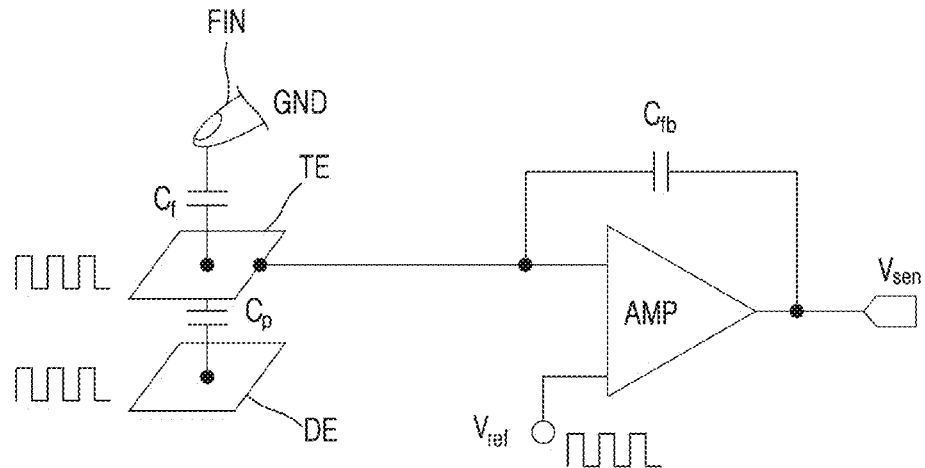
FIGS. 7A and 7B show a sensing circuit and a touch driving state of a touch driving circuit according to a second embodiment of the present disclosure.
Figure 7B:
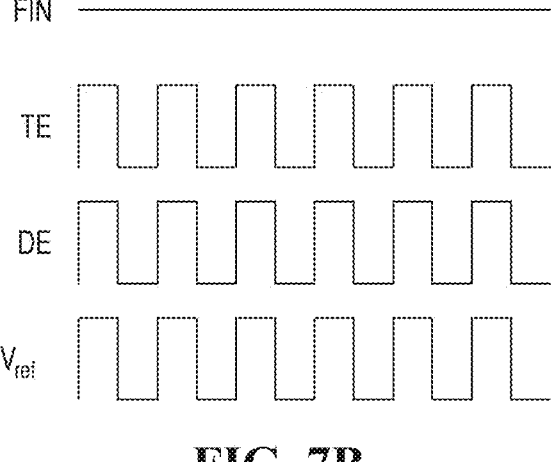

FIGS. 7A and 7B show a sensing circuit and a touch driving state of a touch driving circuit according to a second embodiment of the present disclosure.

Referring to FIGS. 7A and 7B, when a driving voltage having the same cycle and same amplitude is applied to the touch electrode TE and the display electrode DE, there is no voltage difference between the electrodes of the parasitic capacitor $C_p$, and thus there is no change in amount of charges charged in the parasitic capacitor $C_p$.

On the other hand, in the case of a finger capacitor $C_f$ between the finger FIN and the touch electrode TE, since one side is in the ground GND state, and the driving voltage is applied to the other side, the amount of charges charged in the finger capacitor $C_f$ is proportional to the driving voltage.

Figure 8A:
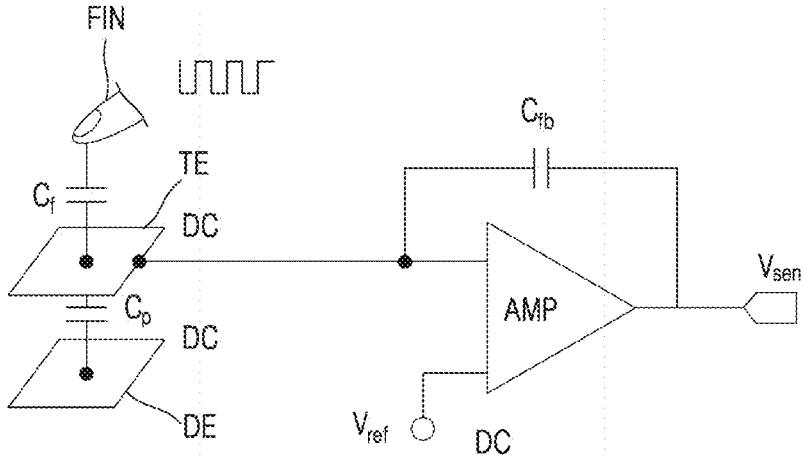
FIGS. 8A and 8B show an equivalent circuit and the touch driving state of the touch driving circuit according to the second embodiment of the present disclosure.
Figure 8B:
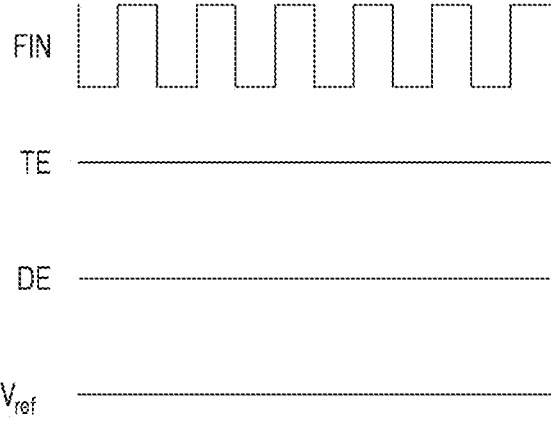

FIGS. 8A and 8B show an equivalent circuit and the touch driving state of the touch driving circuit according to the second embodiment of the present disclosure.

Referring to FIGS. 8A and 8B, since the voltage is relative, the driving described with reference to FIGS. 7A and 7B may be considered equivalent to a case where a driving voltage in a form of a pulse is applied only to the ground electrode of the finger FN in a state in which the touch electrode TE, the display electrode DE, and the input terminal of the reference voltage Vref are DC.

The amount of charges sensed at this time may be represented by the product of the driving voltage generated from the finger FIN and the capacitance the finger capacitor $C_f$.

Therefore, when the touch electrode TE, the display electrode DE, and the input terminal of the reference voltage Vref are driven by a driving signal having the same cycle and amplitude as described above, only the amount of charges stored in the finger capacitor $C_f$ may be read regardless of the parasitic capacitance of the parasitic capacitor $C_p$, thereby improving touch performance.

Referring back to FIGS. 1 and 2, the in-cell touch display device according to one embodiment of the present disclosure may generate the modulation voltage having the same cycle and amplitude in the display electrode and the touch electrode.

The organic light emitting diode display panel may have the high potential power voltage $V_{dd}$ and the low potential power voltage $V_{ss}$ that supply a current, a gate voltage (or a scan pulse), a data voltage, etc.

The power supply circuit 200 may generate the high potential power voltage $V_{dd}$ and the low potential power voltage $V_{ss}$ based on the input power VIN and the ground power GND and provide the high potential power voltage $V_{dd}$ and the low potential power voltage $V_{ss}$ to the first RLC circuits $R_{mod1}$, $L_{mod1}$, and $C_{mod1}$ and the second RLC circuits $R_{mod2}$, $L_{mod2}$, and $C_{mod2}$, respectively.

In addition, the power supply circuit 200 may generate the first modulation control voltage $V_{mod1}$ and the second modulation control voltage $V_{mod2}$ used to modulate the high potential power voltage $V_{dd}$ and the low potential power voltage $V_{ss}$ based on the input power VIN and ground power GND and provide the first modulation control voltage $V_{mod1}$ and the second modulation control voltage $V_{mod2}$ to one ends of the first capacitor $C_{mod1}$ of the first RLC circuit and one end of the second capacitor $C_{mod2}$ of the second RLC circuit, respectively.

In addition, during the display period, the power supply circuit 200 may provide the high potential gate driving voltage $V_{gh}$ and the low potential gate driving voltage $V_{gl}$ to the gate driver GDIC and provide the gamma voltage $V_{gamma}$ to the source driver SDIC.

In addition, during the touch period, the power supply circuit 200 may modulate the high potential gate driving voltage $V_{gh}$ and the low potential gate driving voltage $V_{gl}$ into levels having a predetermined cycle and amplitude and provide the modulated high potential gate driving voltage $V_{gh}$ and low potential gate driving voltage $V_{gl}$ to the gate driver GDIC.

In addition, during the touch period, the power supply circuit 200 may provide the touch driving voltage $V_{touch}$ having the predetermined cycle and amplitude to the touch driving circuit ROIC. In addition, the power supply circuit 200 may modulate the gamma voltage $V_{gamma}$ into the level having the predetermined cycle and amplitude and provide the modulated gamma voltage to the source driver SDIC.

The power modulation circuit 400 may modulate the high potential power voltage $V_{dd}$ and the low potential power voltage $V_{ss}$ output from the power supply circuit 200 into the high potential modulation voltage $V_{dd\_mod}$ and the low potential modulation voltage $V_{ss\_mod}$ using the first RLC circuits $R_{mod1}$, $L_{mod1}$, and $C_{mod1}$ and the second RLC circuits $R_{mod2}$, $L_{mod2}$, and $C_{mod2}$.

During the touch period, the power modulation circuit 400 may modulate the high potential power voltage $V_{dd}$ and the low potential power voltage $V_{ss}$ into the high potential modulation voltage $V_{dd\_mod}$ and the low potential modulation voltage $V_{ss\_mod}$ that have the same cycle and amplitude as the touch driving voltage Vtouch and provide the modulated high potential modulation voltage $V_{dd\_mod}$ and low potential modulation voltage $V_{ss\_mod}$ to a plurality of subpixels.

In addition, the power modulation circuit 400 may provide the modulated display voltage having the same cycle and amplitude as the touch driving voltage $V_{touch}$ to the gate driver GDIC and the source driver SDIC based on the high potential modulation voltage $V_{dd\_mod}$ and the low potential modulation voltage $V_{ss\_mod}$.

In addition, the power modulation circuit 400 may provide the modulated reference voltage having the same cycle and amplitude as the touch driving voltage $V_{touch}$ the touch driving circuit ROIC based on the high potential modulation voltage $V_{dd\_mod}$ and the low potential modulation voltage $V_{ss\_mod}$.

Figure 9A:
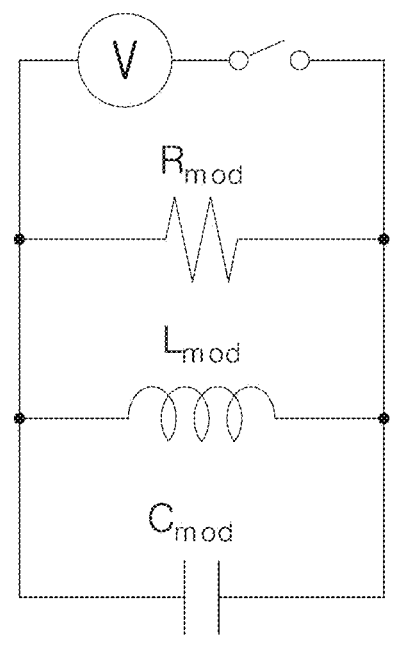
FIGS. 9A and 9B show a parallel RLC circuit and voltage characteristics according to values of $\tau$ and $\omega_c$ according to one or more embodiments of the present disclosure.
Figure 9B:
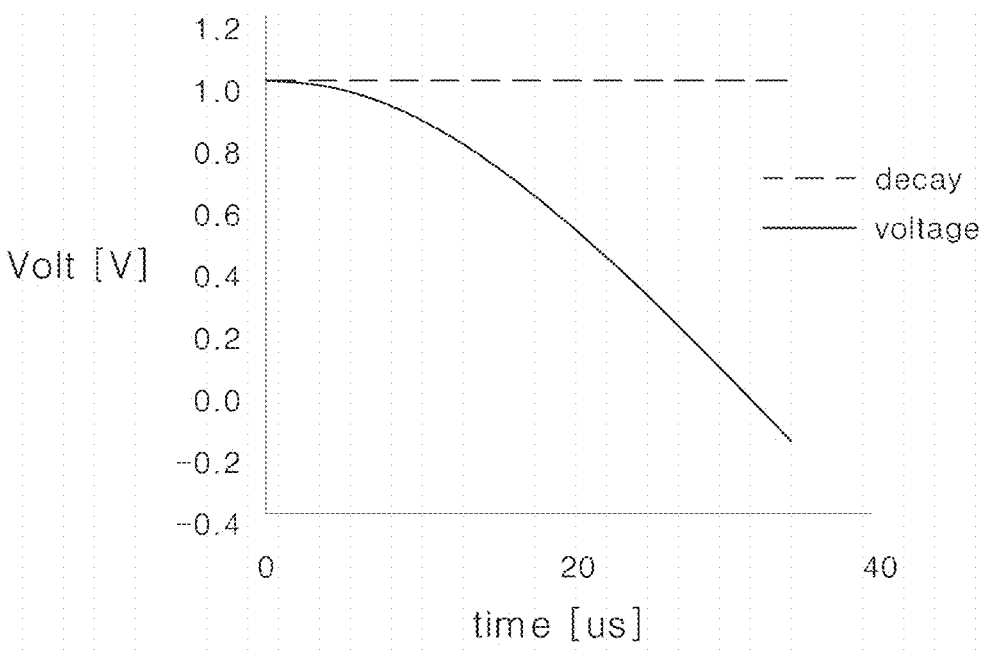
Figure 10A:
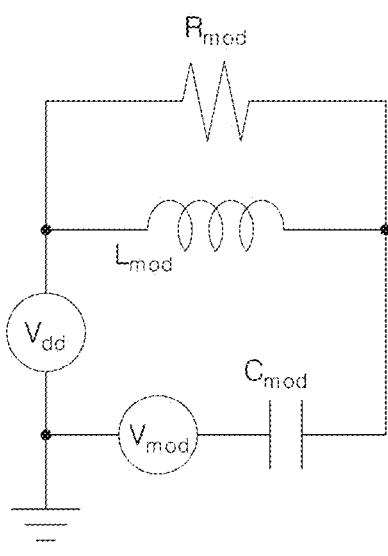
FIGS. 10A and 10B show a parallel RLC circuit to which a modulation voltage is applied and voltage characteristics according to the application of the modulation voltage according to one or more embodiments of the present disclosure.
Figure 10B:
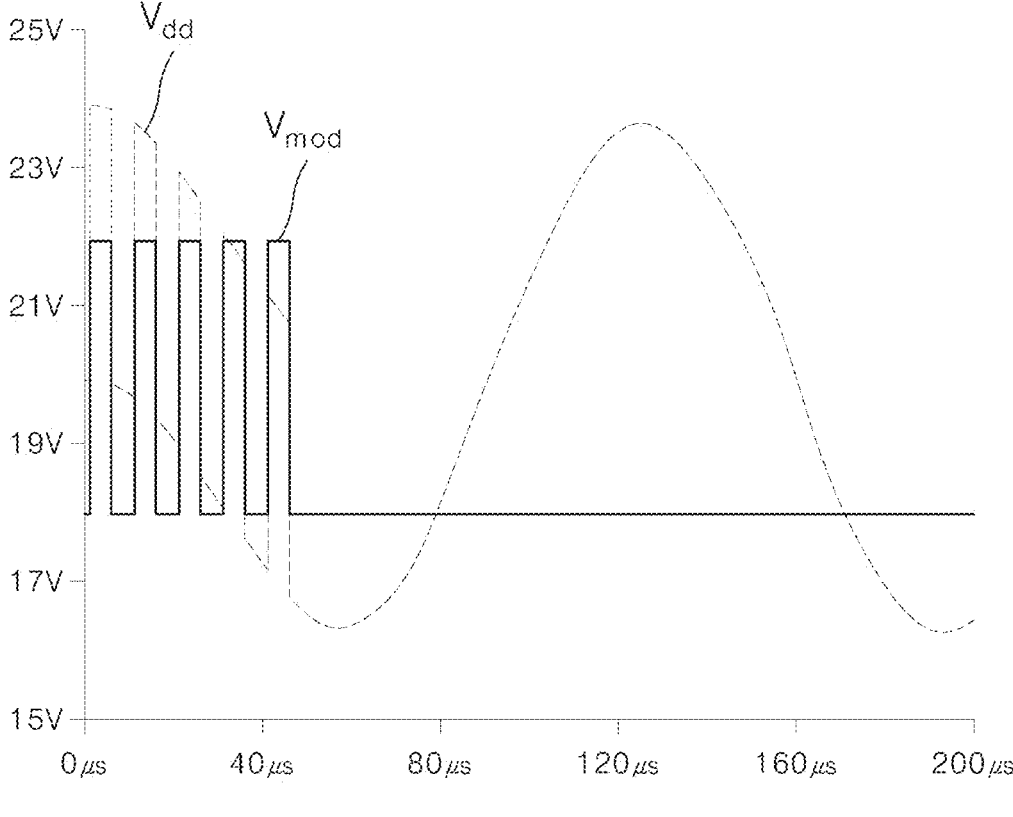

FIGS. 9A and 9B show a parallel RLC circuit and voltage characteristics according to values of $\tau$ and $\omega d$ according to one or more embodiments of the present disclosure. FIGS. 10A and 10B show a parallel RLC circuit to which a modulation control voltage is applied and voltage characteristics according to the application of the modulation control voltage according to one or more embodiments of the present disclosure.

Referring to FIGS. 9A and 9B, when a switch of the parallel RLC circuit is turned on, a voltage applied to the circuit is shown in Equation 1.

$$V = V_0 \exp(-t/\tau)\sin(\omega_d t) \qquad \text{[Equation 1]}$$

$$\left(\omega_0^2 = \frac{1}{LC}, \sigma = \frac{1}{2\tau} = \frac{R}{2L}, \omega_d^2 = \omega_0^2 - \sigma^2, \tau = RC\right)$$

In this case, voltage characteristics according to values of $\tau=1$ and $\omega_d=50$ kHz are shown in FIG. 9B.

Under the above condition, as shown in FIGS. 10A and 10B, when five modulation control voltage pulses having a predetermined cycle and amplitude are applied to one end of the first capacitor $C_{mod1}$ of the first RLC circuit and one end of the second capacitor $C_{mod2}$ of the second RLC circuit in a start section, waveforms such as the high potential modulation voltage $V_{dd\_mod}$ and the low potential modulation voltage $V_{ss\_mod}$ that have the same cycle and amplitude as the modulation control voltage pulse may be obtained. When $\tau$ is great and $\omega d$ is small, it can be seen that the applied modulation control voltage $V_{mod}$ is output by being loaded on the high potential power voltage $V_{dd}$.

Figure 11:
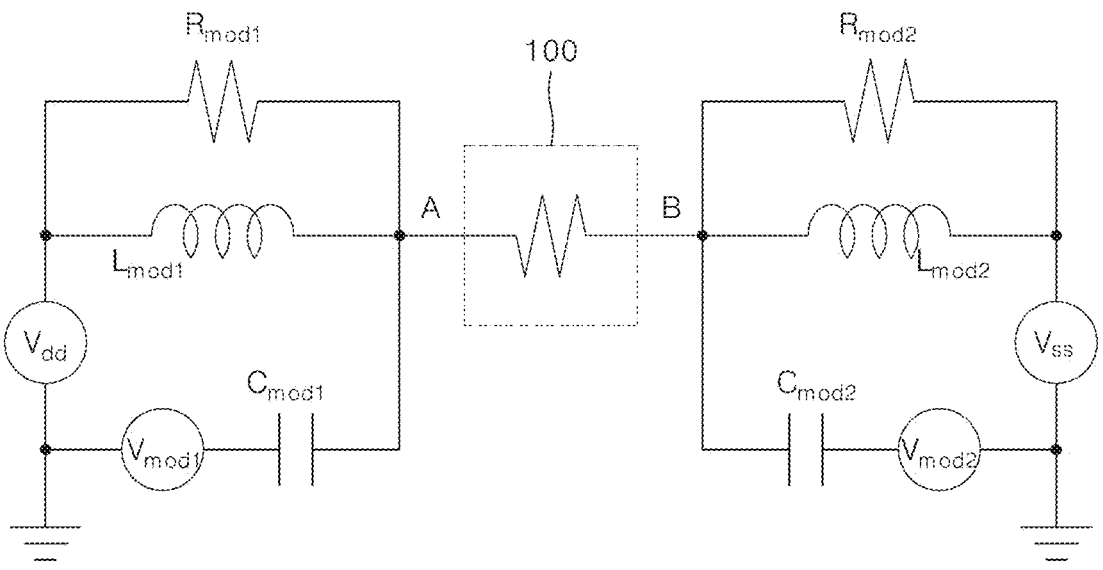
FIG. 11 shows a power modulation circuit to which the in-cell touch display device according to one or more embodiments of the present disclosure is applied.

FIG. 11 shows a power modulation circuit to which the in-cell touch display device is applied according to one or more embodiments of the present disclosure.

Referring to FIG. 11, the high potential power voltage $V_{dd}$ and the low potential power voltage $V_{ss}$ are designed with the resistors $R_{mod1}$ and $R_{mod2}$, the inductors $L_{mod1}$ and $L_{mod2}$, and the capacitors $C_{mod1}$ and $C_{mod2}$ that have the same values, and when the modulation control voltages $V_{mod1}$ and $V_{mod2}$ having the same value are applied, a voltage difference between node A and node B may always be kept constant.

That is, the high potential power voltage $V_{dd}$ and the low potential power voltage $V_{ss}$ are applied to a load terminal of the display panel 100, and the flowing current may be kept constant regardless of the modulation control voltages $V_{mod1}$ and $V_{mod2}$.

In addition, when the modulation control voltages $V_{mod1}$ and $V_{mod2}$ are generated and applied based on the high potential power voltage $V_{dd}$ and the low potential power voltage $V_{ss}$, respectively, harmonic components of the high potential modulation voltage $V_{dd\_mod}$ and the low potential modulation voltage $V_{ss\_mod}$ may be greatly reduced.

Figure 12:
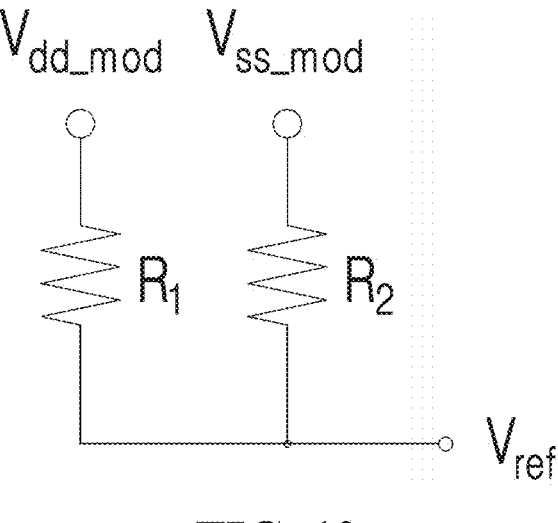
FIG. 12 shows a reference voltage generation circuit of the power modulation circuit applied to the in-cell touch display device according to one or more embodiments of the present disclosure.

FIG. 12 shows a reference voltage generation circuit of the power modulation circuit applied to the in-cell touch display device according to one or more embodiments of the present disclosure.

Referring to FIGS. 1 and 12, the power modulation circuit 400 may include a reference voltage generation circuit. The power modulation circuit 400 may include the first distribution resistor $R_1$ having one end connected to the first power line PL1 and the other end connected to the output terminal of the reference voltage $V_{ref}$, and the second distribution resistor $R_2$ having one end connected to the second power line PL2 and the other end connected to the output terminal of the reference voltage $V_e$f.

During the touch period, the reference voltage $V_{ref}$ may be modulated into a level having the same cycle and amplitude as the high potential modulation voltage $V_{dd\_mod}$ and the low potential modulation voltage $V_{ss\_mod}$ according to the high potential modulation voltage $V_{dd\_mod}$, and the low potential modulation voltage $V_{ss\_mod}$ that are modulated by the first RLC circuits $R_{mod1}$, $L_{mod1}$, and $C_{mod1}$, and the second RLC circuits $R_{mod2}$, $L_{mod2}$, and $C_{mod2}$.

Figure 13:
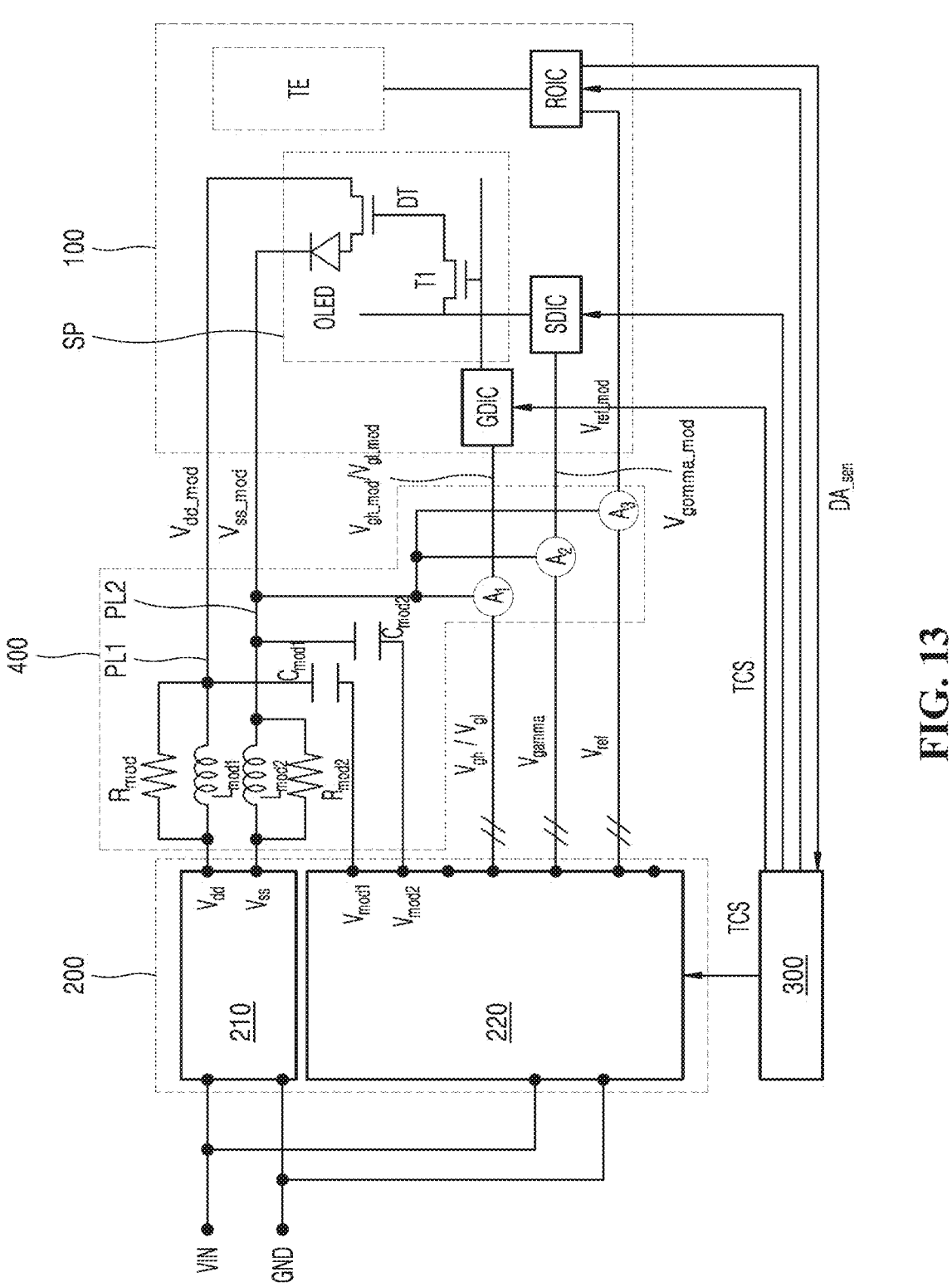
FIG. 13 shows an in-cell touch display device according to one or more other embodiments of the present disclosure.

FIG. 13 shows an in-cell touch display device according to one or more other embodiments of the present disclosure.

Referring to FIG. 13, the in-cell touch display device according to one or more other embodiments of the present disclosure may include the display panel 100 and the power modulation circuit 400.

The display panel 100 may include a plurality of sub-pixels SP and a plurality of touch electrodes TE and may be driven in the display period Td and the touch period Tt in the time-division manner according to the touch control signal TCS.

The power modulation circuit 400 may include the first RLC circuits $R_{mod1}$, $L_{mod1}$, and $C_{mod1}$, the second RLC circuits $R_{mod2}$, $L_{mod2}$, and $C_{mod2}$, and addition circuits A1, A2, and A3.

The first RLC circuits $R_{mod1}$, $L_{mod1}$, and $C_{mod1}$ may include the first resistor $R_{mod1}$, the first inductor $L_{mod1}$, and the first capacitor $C_{mod1}$ that are connected in parallel to the first power line PL1. Here, the output terminal of the high potential power voltage $V_{dd}$ may be connected to the first power line PL1.

Here, the first resistor $R_{mod1}$ may have one end connected to the output terminal of the high potential power voltage $V_{dd}$ and the other end connected to the driving transistor DT of the sub-pixel SP. The first inductor $L_{mod1}$ may have one end connected to the output terminal of the high potential power voltage $V_{dd}$ and the other end connected to the driving transistor DT of the sub-pixel SP. The first capacitor $C_{mod1}$ may have one end connected to the output terminal of the first modulation control voltage $V_{mod1}$ and the other end connected to the driving transistor DT of the sub-pixel SP.

During the touch period, the first RLC circuits $R_{mod1}$, $L_{mod1}$, and $C_{mod1}$ may receive the first modulation control voltage $V_{mod1}$ having a predetermined cycle and amplitude through one end of the first capacitor $C_{mod1}$. During the touch period, the first RLC circuits $R_{mod1}$, $L_{mod1}$, and $C_{mod1}$ may modulate the high potential power voltage $V_{dd}$ into the high potential modulation voltage $V_{dd\_mod}$ according to the first modulation control voltage $V_{mod1}$ and provide the high potential modulation voltage $V_{dd\_mod}$ to the driving transistor DT of the sub-pixel SP through the first power line PL1.

The second RLC circuits $R_{mod2}$, $L_{mod2}$, and $C_{mod2}$ may include the second resistor $R_{mod2}$, the second inductor $L_{mod2}$, and the second capacitor $C_{mod2}$ that are connected in parallel to the second power line PL2. Here, the output terminal of the low potential power voltage $V_{ss}$ may be connected to the second power line PL2.

Here, the second resistor $R_{mod2}$ may have one end connected to the output terminal of the low potential power voltage $V_{ss}$ and the other end connected to the light emitting element OLED of the sub-pixel SP. The second inductor $L_{mod2}$ may have one end connected to the output terminal of the low potential power voltage $V_{ss}$ and the other end connected to the light emitting element OLED of the sub-pixel SP. The second capacitor $C_{mod2}$ may have one end connected to the output terminal of the second modulation control voltage $V_{mod2}$ and the other end connected to the light emitting element OLED of the sub-pixel SP.

During the touch period, the second RLC circuits $R_{mod2}$, $L_{mod2}$, and $C_{mod2}$ may receive the second modulation control voltage $V_{mod2}$ having the predetermined cycle and amplitude through the one end of the second capacitor $C_{mod2}$. During the touch period, the second RLC circuits $R_{mod2}$, $L_{mod2}$, and $C_{mod2}$ may modulate the low potential power voltage $V_{ss}$ into the low potential modulation voltage $V_{ss\_mod}$ according to the second modulation control voltage $V_{mod2}$ and provide the low potential modulation voltage $V_{ss\_mod}$ to the light emitting element OLED of the sub-pixel SP through the second power line PL2.

When the high potential modulation voltage $V_{dd\_mod}$ and the low potential modulation voltage $V_{ss\_mod}$ resonate with the resonance frequency of the RLC, the display voltage and the touch voltage may be added to the low potential modulation voltage $V_{ss\_mod}$ using an analog adder and output as a modulated display voltage and a modulated touch voltage.

The addition circuits A1, A2, and A3 may acquire the modulated display voltage $V_{gh\_mod}$, $V_{gl\_mod}$, or $V_{gamma\_mod}$ by adding the display voltage $V_{gh}$, $V_{gl}$, or $V_{gamma}$ to the low potential modulation voltage $V_{ss\_mod}$ and supply the modulated display voltage $V_{gh\_mod}$, $V_{gl\_mod}$, or $V_{gamma}$ m to the display driving circuits GDIC and SDIC.

In addition, the addition circuits A1, A2, and A3 may acquire a modulated touch voltage $V_{touch\_mod}$ or $V_{ref\_mod}$ by adding the touch voltage $V_{touch}$ or $V_{ref}$ to the low potential modulation voltage $V_{ss\_mod}$ and provide the modulated touch voltage $V_{touch\_mod}$ or $V_{ref\_mod}$ to the touch driving circuit ROIC.

The addition circuits A1, A2, and A3 may include the first adder A1, the second adder A2, and the third adder A3.

The first adder A1 may acquire the modulated high potential gate driving voltage $V_{gh\_mod}$ and the modulated low potential gate driving voltage $V_{gl\_mod}$ by respectively adding the high potential gate driving voltage $V_{gh}$ and the low potential gate driving voltage $V_{gl}$ as the display voltage to the low potential modulation voltage $V_{ss\_mod}$ and provide the modulated high potential gate driving voltage $V_{gh\_mod}$ and the modulated low potential gate driving voltage $V_{gl\_mod}$ to the gate driver GDIC.

The second adder A2 may acquire the modulated gamma voltage $V_{gamma\_mod}$ by adding the gamma voltage $V_{gamma}$ as the display voltage to the low potential modulation voltage $V_{ss\_mod}$ and provide the modulated gamma voltage $V_{gamma\_mod}$ to the source driver SDIC.

The third adder A3 may acquire the modulated touch driving voltage $V_{touch\_mod}$ or the modulated reference voltage $V_{ref\_mod}$ by adding the touch driving voltage $V_{touch}$ or the reference voltage $V_{ref}$ as the touch voltage to the low potential modulation voltage $V_{ss\_mod}$ and provide the modulated touch driving voltage $V_{touch\_mod}$ or the modulated reference voltage $V_{ref\_mod}$ to the touch driving circuit ROIC.

An in-cell touch display device according to another embodiment of the present disclosure may further include the power supply circuit 200. The power supply circuit 200 may include the first power supply circuit 210 and the second power supply circuit 220.

The first power supply circuit 210 may generate the high potential power voltage $V_{dd}$ and the low potential power voltage $V_{ss}$ based on the input power VIN and the ground power GND and provide the high potential power voltage $V_{dd}$ and the low potential power voltage $V_{ss}$ to the first RLC circuit and the second RLC circuit, respectively.

The second power supply circuit 220 may generate the first modulation control voltage $V_{mod1}$ and the second modulation control voltage $V_{mod2}$ used to modulate the high potential power voltage $V_{dd}$ and the low potential power voltage $V_{ss}$ based on the input power VIN and the ground power GND and provide the first modulation control voltage $V_{mod1}$ and the second modulation control voltage $V_{mod12}$ to one end of the first capacitor of the first RLC circuit and to one end of the second capacitor of the second RLC circuit, respectively.

In addition, the second power supply circuit 220 may generate the high potential gate driving voltage $V_{gh}$ and the low potential gate driving voltage $V_{gl}$ based on the input power VIN and the ground power GND and supply the high potential gate driving voltage $V_{gh}$ and the low potential gate driving voltage $V_{gl}$ to the first adder A1 of the addition circuit.

In addition, the second power supply circuit 220 may generate the gamma voltage $V_{gamma}$ based on the input power VIN and the ground power GND and provide the gamma voltage $V_{gamma}$ to the second adder A2 of the addition circuit.

In addition, the second power supply circuit 220 may generate the touch driving voltage Vouch and the reference voltage $V_{ref}$ based on the input power VIN and the ground power GND and provide the touch driving voltage $V_{touch}$ and the reference voltage $V_{ref}$ to the third adder A3 of the addition circuit.

Figure 14:
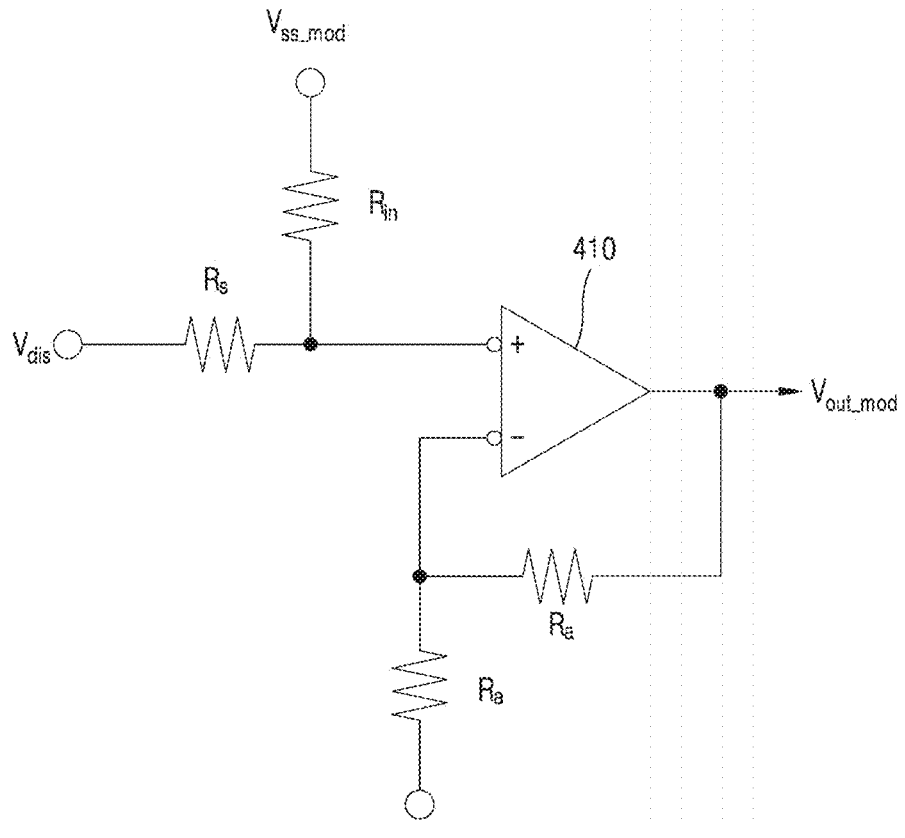
FIG. 14 shows an adder of FIG. 13 according to one or more other embodiments of the present disclosure.
Figure 15:
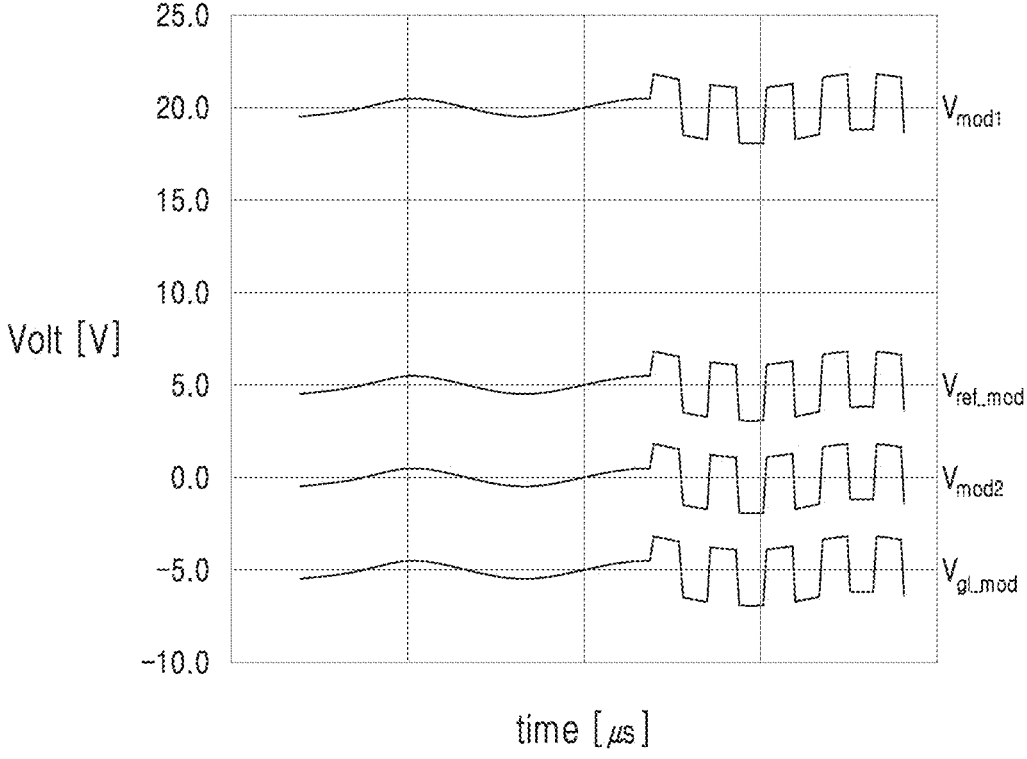
FIG. 15 shows a timing diagram of the in-cell touch display device according to one or more other embodiments of the present disclosure.

FIG. 14 shows an adder of FIG. 13 according to one or more other embodiments of the present disclosure. FIG. 15 shows a timing diagram of the in-cell touch display device according to one or more other embodiments of the present disclosure.

Referring to FIG. 14, the adder includes an operational amplifier 410 and an input resistor $R_{in}$ and a source resistor $R_s$ connected in parallel to a positive input terminal (+).

The low potential modulation voltage $V_{ss\_mod}$ may be applied to one end of the input resistor $R_{in}$, and an input voltage Vis may be applied to one end of the source resistor $R_s$. Here, the input voltage $V_{dis}$ is the display voltage and may be the high potential gate driving voltage $V_{gh}$, the low potential gate driving voltage $V_{gl}$, or the gamma voltage $V_{gamma}$. Alternatively, the input voltage $V_{dis}$ is the touch voltage and may be the touch driving voltage $V_{touch}$ or the reference voltage $V_{ref}$.

The output of the analog adder under the voltage condition shown in FIG. 15 is shown in Equation 2 below.

$$V_{out} = 2\frac{R_s V_{ss\_mod} + R_{in} V_{dis}}{R_s + R_{in}} \qquad \text{[Equation 2]}$$

When the values of the input resistor $R_{in}$ and the source resistor $R_s$ are the same, an output voltage may be represented by $V_{out} = V_{ss\_mod} + V_{dis}$. That is, in the case where the low potential power voltage $V_{ss}$ is 0 V and the low potential modulation voltage $V_{ss\_mod}$ has a sine wave centered at 0 V, when the reference voltage $V_{ref}$ is 5 V and the reference voltage $V_{ref}$ and the low potential modulation voltage $V_{ss\_mod}$ are input to the adder, as shown in FIG. 15, it can be seen that the output voltage has a sine wave centered at 5 V, and the reference voltage $V_{ref}$ is modulated in a touch section.

According to the embodiments of the present disclosure, when the in-cell touch sensor technology is applied to the display panel, it is possible to prevent or at least reduce the generation of the parasitic capacitance between the touch electrode and the display electrode, thereby improving touch sensitivity and the accuracy of touch recognition.

In addition, it is possible to reduce the thickness of the display panel, implement the curved surface, and improve the degradation of the image quality due to crosstalk with the touch voltage.

In addition, it is possible to easily generate the uplink signal by increasing the touch sensitivity, thereby enabling the active pen touch.

In addition, since the frequency and the damping constant may be adjusted through the resistance value, the inductor can be implemented even when the inductor is not large.

In addition, it is possible to implement process optimization by reducing the touch cost and the production energy.

In addition, since the large parasitic capacitance between the touch electrode and the display electrode does not need to be filled, it is possible to reduce the consumed power, thereby implementing low power.

An in-cell touch display device according to one or more embodiments of the present disclosure may include a display panel that includes a transistor formation layer including a semiconductor, a source electrode, a drain electrode, and a gate electrode of a driving transistor, a light emitting element layer disposed on the transistor formation layer and including an anode electrode, an emission layer, and a cathode electrode of the light emitting element, and a plurality of touch electrodes disposed on the transistor formation layer or the light emitting element, and is driven during a display period and a touch period in a time-division manner, a touch driving circuit for supplying a touch driving voltage having a predetermined cycle and amplitude to a touch electrode, and a power modulation circuit including a first RLC circuit and a second RLC circuit in which a resistor, an inductor, and a capacitor are connected in parallel to each of a high potential power line through which a high potential power voltage is supplied to the driving transistor and a low potential power line through which a low potential power voltage is supplied to a cathode electrode.

According to one or more embodiments of the present disclosure, during the touch period, the power modulation circuit may modulate the high potential power voltage and the low potential power voltage into a high potential modulation voltage and a low potential modulation voltage that have a resonance frequency of the resistor, the inductor, and the capacitor and provide the high potential modulation voltage and the low potential modulation voltage to the high potential power line and the low potential power line, respectively.

According to one or more embodiments of the present disclosure, during the touch period, a first modulation control voltage and a second modulation control voltage that have a predetermined cycle and amplitude may be applied to one ends of a first capacitor of the first RLC circuit and a second capacitor of the second RLC circuit, respectively.

According to one or more embodiments of the present disclosure, during the display period, the first modulation control voltage may be applied at the level of the high potential power voltage, the second modulation control voltage may be applied at the level of the low potential power voltage, and during the touch period, the first modulation control voltage may be applied at the level having a predetermined cycle and amplitude with respect to the level of the high potential power voltage, and the second modulation control voltage may be applied at the level having a predetermined cycle and amplitude with respect to the level of the low potential power voltage.

According to one or more embodiments of the present disclosure, the first RLC circuit may include a first resistor having one end connected to an output terminal of the high potential power voltage and the other end connected to a driving transistor, a first inductor having one end connected to the output terminal of the high potential power voltage and the other end connected to the driving transistor, and a first capacitor having one end connected to an output terminal of the first modulation control voltage and the other end connected to the driving transistor.

According to one or more embodiments of the present disclosure, the second RLC circuit may include a second resistor having one end connected to an output terminal of the low potential power voltage and the other end connected to a light emitting element, a second inductor having one end connected to the output terminal of the low potential power voltage and the other end connected to the light emitting element, and a second capacitor having one end connected to an output terminal of the second modulation control voltage and the other end connected to the light emitting element.

According to one or more embodiments of the present disclosure, the in-cell touch display device may further include a first distribution resistor having one end connected to a first power line and the other end connected to an output terminal of a reference voltage, and a second distribution resistor having one end connected to a second power line and the other end connected to the output terminal of the reference voltage.

According to one or more embodiments of the present disclosure, the output terminal of the reference voltage may be connected to an input terminal of the reference voltage of a touch driving circuit for sensing a change in capacitor of the touch electrode.

According to one or more embodiments of the present disclosure, during the touch period, the reference voltage may be modulated into a level having the same cycle and amplitude as the high potential modulation voltage and the low potential modulation voltage that are modulated by the first RLC circuit and the second RLC circuit.

According to one or more embodiments of the present disclosure, the in-cell touch display device may further include a first power supply circuit for generating the high potential power voltage and the low potential power voltage based on input power and ground power and supplying the high potential power voltage and the low potential power voltage to the first RLC circuit and the second RLC circuit, and a second power supply circuit for generating a first modulation control voltage and a second modulation control voltage used for modulating the high potential power voltage and the low potential power voltage based on the input power and the ground power and supplying the first modulation control voltage and the second modulation control voltage to the one ends of the first capacitor of the first RLC circuit and the second capacitor of the second RLC circuit.

According to one or more embodiments of the present disclosure, the second power supply circuit may supply the first modulation control voltage at the level of the high potential power voltage and supply the second modulation control voltage at the level of the low potential power voltage during the display period, and supply the first modulation control voltage at the level having a predetermined cycle and amplitude with respect to the level of the high potential power voltage and supply the second modulation control voltage at the level having a predetermined cycle and amplitude with respect to the level of the low potential power voltage during the touch period.

According to one or more embodiments of the present disclosure, the second power supply circuit may generate a high potential gate driving voltage and a low potential gate driving voltage based on the input power and the ground power and supply the high potential gate driving voltage and the low potential gate driving voltage during the display period, modulate the high potential gate driving voltage at the level having a predetermined cycle and amplitude with respect to the high potential gate driving voltage and modulate the low potential gate driving voltage into a level having a predetermined cycle and amplitude with respect to the low potential gate driving voltage to supply the modulated high potential gate driving voltage and the modulated low potential gate driving voltage to a gate driver during the touch period, and supply a touch driving voltage to a touch driving circuit during the touch period.

According to one or more embodiments of the present disclosure, a scan signal output from the gate driver may have the same predetermined cycle and amplitude as the touch driving voltage during the touch period.

An in-cell touch display device according to one or more other embodiments of the present disclosure may include a display panel that includes a transistor formation layer including a semiconductor, a source electrode, a drain electrode, and a gate electrode of a driving transistor, a light emitting element layer disposed on the transistor formation layer and including an anode electrode, an emission layer, and a cathode electrode of the light emitting element, and a plurality of touch electrodes disposed on the transistor formation layer or the light emitting element, and is driven during a display period and a touch period in a time-division manner, a touch driving circuit for supplying a touch driving voltage having a predetermined cycle and amplitude to a touch electrode, a first RLC circuit and a second RLC circuit in which a resistor, an inductor, and a capacitor are connected in parallel to each of a high potential power line through which a high potential power voltage is supplied to the driving transistor and a low potential power line through which a low potential power voltage is supplied to a cathode electrode and which modulate the high potential power voltage and the low potential power voltage into a high potential modulation voltage and a low potential modulation voltage that have a resonance frequency of the resistor, the inductor, and the capacitor connected in parallel, and supply the high potential modulation voltage and the low potential modulation voltage to the display panel, and an addition circuit for acquiring a modulated display voltage by adding the low potential modulation voltage and the display voltage, supplying the modulated display voltage to a display driving circuit, acquiring a modulated touch voltage by adding the low potential modulation voltage and the touch voltage, and supplying the modulated touch voltage to the touch driving circuit.

According to one or more other embodiments of the present disclosure, the addition circuit may further include a first adder for acquiring a modulated high potential gate driving voltage and a modulated low potential gate driving voltage by adding the high potential gate driving voltage and the low potential gate driving voltage as the display voltages to the low potential modulation voltage and providing the high potential gate driving voltage and the modulated low potential gate driving voltage to the gate driver of the display driving circuit.

According to one or more other embodiments of the present disclosure, the addition circuit may further include a second adder for acquiring a modulated gamma voltage by adding the gamma voltage as the display voltage to the low potential modulation voltage and providing the modulated gamma voltage to the source driver of the display driving circuit.

According to one or more other embodiments of the present disclosure, the addition circuit may further include a third adder for acquiring a modulated reference voltage by adding the reference voltage as the touch voltage to the low potential modulation voltage and providing the modulated reference voltage to the touch driving circuit.

According to one or more other embodiments of the present disclosure, the in-cell touch display device may further include a first power supply circuit for generating the high potential power voltage and the low potential power voltage based on input power and ground power and supplying the high potential power voltage and the low potential power voltage to the first RLC circuit and the second RLC circuit, and a second power supply circuit for generating a first modulation control voltage and a second modulation control voltage used for modulating the high potential power voltage and the low potential power voltage based on the input power and the ground power and supplying the first modulation control voltage and the second modulation control voltage to the one ends of the first capacitor of the first RLC circuit and the second capacitor of the second RLC circuit.

According to one or more other embodiments of the present disclosure, the second power supply circuit may generate the high potential gate driving voltage and the low potential gate driving voltage based on the input power and the ground power and supply the high potential gate driving voltage and the low potential gate driving voltage to the first adder of the addition circuit, generate the gamma voltage based on the input power and the ground power and supply the gamma voltage to the second adder of the addition circuit, and generate the reference voltage based on the input power and the ground power and supply the reference voltage to the third adder of the addition circuit.

An in-cell touch display device according to one or more other embodiments of the present disclosure may include that a display panel including a transistor formation layer comprising a driving transistor, a light emitting element layer including a light emitting device that is connected to the driving transistor and emits light during a display period of the in-cell touch display device, and a touch electrode in the transistor formation layer or the light emitting element layer; a touch driving circuit configured to supply a touch driving voltage to the touch electrode and senses a change in capacitance of the touch electrode during a touch period of the touch display device, the touch period non-overlapping with the display period; and a power modulation circuit including a first RLC circuit having a first resonance frequency and a second RLC circuit having a second resonance frequency that is different from the first resonance frequency. Wherein the first RLC circuit may modulate a high potential power voltage into a high potential modulation voltage of the first resonance frequency and outputs the high potential modulation voltage to the driving transistor during the touch period, and the second RLC circuit may modulate a low potential power voltage that is less than the high potential power voltage into a low potential modulation voltage of the second resonance frequency during the touch period and outputs the low potential power voltage to the light emitting device.

According to one or more other embodiments of the present disclosure, the first RLC circuit may include a first resistor, a first inductor, and a first capacitor that are connected to a high potential power line through which the high potential modulation voltage is output to the driving transistor, at least the first resistor and the first inductor connected in parallel, and the second RLC circuit may include a second resistor, a second inductor, and a second capacitor that are connected to a low potential power line through which the low potential modulation voltage is output to the light emitting device, at least the second resistor and the second inductor connected in parallel.

According to one or more other embodiments of the present disclosure, may further comprise a power supply circuit configured to: generate a first modulation control voltage that is supplied to the first capacitor, the first RLC circuit modulating the high potential power voltage into the high potential modulation voltage of the first resonance frequency based on the first modulation control voltage; and generate a second modulation control voltage that is supplied to the second capacitor, the second RLC circuit modulating the low potential power voltage into the low potential modulation voltage of the second resonance frequency based on the second modulation control voltage.

According to one or more other embodiments of the present disclosure, during the display period, the power supply circuit may generate the first modulation control voltage as a first direct current (DC) voltage that is a same as the high potential power voltage and the second modulation control voltage as a second DC voltage that is a same as the low potential power voltage, and during the touch period, the power supply circuit may generate the first modulation control voltage having a first frequency and a first amplitude and the second modulation control voltage having a second cycle and a second amplitude.

According to one or more other embodiments of the present disclosure, may further comprise: a display driving circuit that drives the driving transistor; a first adder that generates, during the touch period, a modulated display voltage by adding a display voltage and the low potential modulation voltage and outputs the modulated display voltage to the display driving circuit; and a second adder that generates, during the touch period, a modulated touch voltage by adding a touch voltage and the low potential modulation voltage and outputs the modulated touch voltage to the touch driving circuit.

According to the embodiments of the present disclosure, when the in-cell touch display panel is applied to the display panel, it is possible to prevent or at least reduce the generation of the parasitic capacitance between the touch electrode and the display electrode, thereby increasing the accuracy of touch sensitivity and touch recognition.

In addition, it is possible to reduce the thickness of the display panel, implement the curved surface, and improve the degradation of the image quality due to crosstalk with the touch voltage.

In addition, it is possible to easily generate the uplink signal by increasing the touch sensitivity, thereby enabling the active pen touch.

In addition, since the frequency and the damping constant may be adjusted through the resistance value, the inductor can be implemented even when the inductor is not large.

In addition, it is possible to implement process optimization by reducing the touch cost and the production energy.

In addition, since the large parasitic capacitance between the touch electrode and the display electrode does not need to be filled, it is possible to reduce the consumed power, thereby implementing low power.

Specific effects together with the above-described effects are described together with a description of the following detailed matters for carrying out the embodiments of the present disclosure.

Although the embodiments of the present disclosure have been described above with reference to exemplary drawings, the present disclosure is not limited by the embodiments and drawings disclosed in the disclosure, and it is apparent that various modifications can be made by those skilled in the art within the scope of the technical spirit of the present disclosure. In addition, even when the operational effects according to the configuration of the embodiments of the present disclosure have not been explicitly described in the description of the embodiments of the present disclosure, it goes without saying that the effects predictable by the corresponding configuration should be recognized.

What is claimed is:

1. An in-cell touch display device, comprising:
a display panel including a transistor formation layer that includes a driving transistor having a semiconductor, a source electrode, a drain electrode, and a gate electrode, a light emitting element layer on the transistor formation layer that includes a light emitting element having an anode electrode, an emission layer, and a cathode electrode, and a plurality of touch electrodes in the transistor formation layer or the light emitting element layer, wherein the plurality of touch electrodes are driven during a display period and a touch period in a time-division manner;
a touch driving circuit configured to supply a touch driving voltage of a predetermined cycle and a predetermined amplitude to a touch electrode of the plurality of touch electrodes; and
a power modulation circuit including a first RLC circuit and a second RLC circuit, the first RLC circuit comprising a first resistor, a first inductor, and a first capacitor that are connected to a high potential power line through which a high potential power voltage is supplied to the driving transistor, at least the first resistor and the first inductor connected in parallel, the second RLC circuit comprising a second resistor, a second inductor, and a second capacitor that are connected to a low potential power line through which a low potential power voltage that is less than the high potential power voltage is supplied to the cathode electrode, at least the second resistor and the second inductor connected in parallel.

2. The in-cell touch display device of claim 1, wherein, during the touch period, the power modulation circuit modulates the high potential power voltage into a high potential modulation voltage that has a first resonance frequency of the first resistor, the first inductor, and the first capacitor and outputs the high potential modulation voltage to the high potential power line, and
the power modulation circuit modulates the low potential power voltage into a low potential modulation voltage that has a second resonance frequency of the second resistor, the second inductor, and the second capacitor and outputs the low potential modulation voltage to the low potential power line.

3. The in-cell touch display device of claim 1, wherein, during the touch period, a first modulation control voltage having a first cycle and a first amplitude is applied to the first capacitor of the first RLC circuit, and a second modulation control voltage having a second cycle and a second amplitude is applied to the second capacitor of the second RLC circuit.

4. The in-cell touch display device of claim 3, wherein, during the display period, the first modulation control voltage is applied at a level of the high potential power voltage, and the second modulation control voltage is applied at a level of the low potential power voltage, and
during the touch period, the first modulation control voltage is applied at a level having the first cycle and the first amplitude with respect to the level of the high potential power voltage, and the second modulation control voltage is applied at a level having the second cycle and the second amplitude with respect to the level of the low potential power voltage.

5. The in-cell touch display device of claim 1, wherein:
the first resistor has a first end that is connected to an output terminal of the high potential power voltage and a second end that is connected to the driving transistor;
the first inductor has a first end that is connected to the output terminal of the high potential power voltage and a second end that is connected to the driving transistor; and
the first capacitor has a first end that is connected to an output terminal of a first modulation control voltage and a second end that is connected to the driving transistor.

6. The in-cell touch display device of claim 5, wherein:
the second resistor has a first end that is connected to an output terminal of the low potential power voltage and a second end that is connected to the cathode electrode;
the second inductor has a first end that is connected to the output terminal of the low potential power voltage and a second end that is connected to the cathode electrode; and
the second capacitor has a first end that is connected to an output terminal of a second modulation control voltage and a second end that is connected to the cathode electrode.

7. The in-cell touch display device of claim 1, further comprising:
a first distribution resistor having a first end that is connected to the high potential power line and a second end that is connected to an output terminal of a reference voltage; and
a second distribution resistor having a first end that is connected to the low potential power line and a second end that is connected to the output terminal of the reference voltage.

8. The in-cell touch display device of claim 7, wherein the output terminal of the reference voltage is connected to an input terminal of a reference voltage of the touch driving circuit, and the touch driving circuit is configured to sense a change in capacitance of the touch electrode.

9. The in-cell touch display device of claim 8, wherein, during the touch period, the reference voltage is modulated into a level having a same cycle and a same amplitude as a high potential modulation voltage and a low potential modulation voltage that are modulated by the first RLC circuit and the second RLC circuit.

10. The in-cell touch display device of claim 1, further comprising:

a first power supply circuit configured to generate the high potential power voltage and the low potential power voltage based on input power and ground power and, the first power supply circuit supplying the high potential power voltage and the low potential power voltage to the first RLC circuit and the second RLC circuit; and a second power supply circuit configured to generate a first modulation control voltage and a second modulation control voltage used for modulating the high potential power voltage and the low potential power voltage based on the input power and the ground power and, the second power supply circuit supplying the first modulation control voltage to the first capacitor of the first RLC circuit, and the second power supply circuit supplying the second modulation control voltage to the second capacitor of the second RLC circuit.

11. The in-cell touch display device of claim 10, wherein the second power supply circuit is further configured to:

supply, during the display period, the first modulation control voltage at a level of the high potential power voltage;

supply, during the display period, the second modulation control voltage at a level of the low potential power voltage;

supply, during the touch period, the first modulation control voltage at a first level having a first cycle and a first amplitude with respect to the level of the high potential power voltage; and supply, during the touch period, the second modulation control voltage at a second level having a second cycle and a second amplitude with respect to the level of the low potential power voltage.

12. The in-cell touch display device of claim 10, wherein the second power supply circuit is further configured to:

generate a high potential gate driving voltage and a low potential gate driving voltage that is less than the high potential gate driving voltage based on the input power and the ground power and;

supply, during the display period, the high potential gate driving voltage and the low potential gate driving voltage to a gate driver circuit;

modulate, during the touch period, the high potential gate driving voltage at a first level having a first cycle and a first amplitude with respect to the high potential gate driving voltage to generate a modulated high potential gate driving voltage;

modulate, during the touch period, the low potential gate driving voltage into a second level having a second cycle and a second amplitude with respect to the low potential gate driving voltage to generate a modulated low potential gate driving voltage;

supply, during the touch period, the modulated high potential gate driving voltage and the modulated low potential gate driving voltage to the gate driver circuit; and supply, during the touch period, the touch driving voltage to the touch driving circuit.

13. The in-cell touch display device of claim 12, wherein a scan signal output from the gate driver circuit has a same cycle and a same amplitude as the touch driving voltage during the touch period.

14. An in-cell touch display device, comprising:

a display panel including a transistor formation layer that includes a driving transistor having a semiconductor, a source electrode, a drain electrode, and a gate electrode, a light emitting element layer on the transistor formation layer that includes light emitting element having an anode electrode, an emission layer, and a cathode electrode, and a plurality of touch electrodes in the transistor formation layer or the light emitting element layer, wherein the plurality of touch electrodes are driven during a display period and a touch period in a time-division manner;

a touch driving circuit configured to supply a touch driving voltage of a predetermined cycle and a predetermined amplitude to a touch electrode of the plurality of touch electrodes;

a first RLC circuit including a first resistor, a first inductor, and a first capacitor that are connected to a high potential power line through which a high potential power voltage is supplied to the driving transistor, at least the first resistor and the first inductor connected in parallel, the first RLC circuit modulating the high potential power voltage into a high potential modulation voltage having a first resonance frequency of the first resistor, the first inductor, and the first capacitor, and the first RLC circuit supplying the high potential modulation voltage to the display panel;

a second RLC circuit including a second resistor, a second inductor, and a second capacitor that are connected to a low potential power line through which a low potential power voltage that is less than the high potential power voltage is supplied to the cathode electrode, at least the second resistor and the second inductor connected in parallel, the second RLC circuit modulating the low potential power voltage into a low potential modulation voltage having a second resonance frequency of the second resistor, the second inductor, and the second capacitor, and the second RLC circuit supplying the low potential modulation voltage to the display panel; and an addition circuit configured to:

output a modulated display voltage to a display driving circuit by adding the low potential modulation voltage and a display voltage, and output a modulated touch voltage to the touch driving circuit by adding the low potential modulation voltage and the touch driving voltage.

15. The in-cell touch display device of claim 14, wherein the addition circuit includes a first adder configured to:

generate a modulated high potential gate driving voltage by adding a high potential gate driving voltage and the low potential modulation voltage;

generate a modulated low potential gate driving voltage by adding a low potential gate driving voltage and the low potential modulation voltage; and output the modulated high potential gate driving voltage and the modulated low potential gate driving voltage to a gate driver circuit of the display driving circuit.

16. The in-cell touch display device of claim 15, wherein the addition circuit further includes a second adder configured to:

output a modulated gamma voltage to a source driver circuit of the display driving circuit by adding a gamma voltage as the display voltage and the low potential modulation voltage.

17. The in-cell touch display device of claim 16, wherein the addition circuit further includes a third adder configured to:

output a modulated reference voltage to the touch driving circuit by adding a reference voltage as the touch voltage and the low potential modulation voltage.

18. The in-cell touch display device of claim 17, further comprising:

a first power supply circuit configured to generate the high potential power voltage and the low potential power voltage based on input power and ground power and, the first power supply circuit supplying the high potential power voltage and the low potential power voltage to the first RLC circuit and the second RLC circuit; and a second power supply circuit configured to generate a first modulation control voltage and a second modulation control voltage used for modulating the high potential power voltage and the low potential power voltage based on the input power and the ground power and, the second power supply circuit supplying the first modulation control voltage and the second modulation control voltage to the first capacitor of the first RLC circuit and the second capacitor of the second RLC circuit, wherein the second power supply circuit is configured to:

generate a high potential gate driving voltage and a low potential gate driving voltage based on the input power and the ground power and;

supply the high potential gate driving voltage and the low potential gate driving voltage to the first adder of the addition circuit;

generate a gamma voltage based on the input power and the ground power;

supply the gamma voltage to the second adder of the addition circuit;

generate a reference voltage based on the input power and the ground power; and supply the reference voltage to the third adder of the addition circuit.

19. An in-cell touch display device, comprising:

a display panel including a plurality of sub-pixels and a plurality of touch electrodes, the display panel driven during a display period and a touch period in a time-division manner;

a source driver circuit configured to supply, during the display period, a data voltage corresponding to image data to the display panel;

a gate driver circuit configured to supply, during the display period, a scan pulse to the display panel, the scan pulse synchronized with the data voltage;

a touch driving circuit configured to:

supply a touch driving voltage of a predetermined cycle and a predetermined amplitude to a touch electrode of the plurality of touch electrodes; and sense a change in capacitance of the touch electrode; and a power modulation circuit configured to:

modulate a high potential power voltage into a high potential modulation voltage having a same cycle and an amplitude as the touch driving voltage;

modulate a low potential power voltage that is less than the high potential power voltage into a low potential modulation voltage having the same cycle and the same amplitude as the touch driving voltage;

supply, during the touch period, the high potential modulation voltage and the low potential modulation voltage to the plurality of sub-pixels;

supply a modulated display voltage having the same cycle and the same amplitude as the touch driving voltage to the gate driver circuit and the source driver circuit; and supply a modulated reference voltage having the same cycle and the amplitude as the touch driving voltage to the touch driving circuit based on the high potential modulation voltage and the low potential modulation voltage.

20. The in-cell touch display device of claim 19, wherein the power modulation circuit includes:

a first RLC circuit comprising a first resistor, a first inductor, and a first capacitor connected to a high potential power line, at least the first resistor and the first inductor connected in parallel, the first RLC circuit modulating the high potential power voltage into the high potential modulation voltage having a first resonance frequency of the first resistor, the first inductor, and the first capacitor; and a second RLC circuit comprising a second resistor, a second inductor, and a second capacitor connected to a low potential power line, at least the second resistor and the second inductor connected in parallel, the second RLC circuit modulating the low potential power voltage into the low potential modulation voltage having a second resonance frequency of the second resistor, the second inductor, and the second capacitor.

* * * * *